(12) United States Patent
Cheriton

(10) Patent No.: US 11,714,389 B2
(45) Date of Patent: Aug. 1, 2023

(54) AUTOMATIC GENERATION OF CONTROL DECISION LOGIC FOR COMPLEX ENGINEERED SYSTEMS FROM DYNAMIC PHYSICAL MODEL

(71) Applicant: OptumSoft, Inc., Menlo Park, CA (US)

(72) Inventor: David R. Cheriton, Palo Alto, CA (US)

(73) Assignee: OptumSoft, Inc., Vero Beach, FL (US)

( * ) Notice: Subject to any disclaimer, the term of this patent is extended or adjusted under 35 U.S.C. 154(b) by 356 days.

(21) Appl. No.: 17/156,378

(22) Filed: Jan. 22, 2021

(65) Prior Publication Data

US 2021/0240148 A1 Aug. 5, 2021

Related U.S. Application Data

(60) Provisional application No. 62/968,019, filed on Jan. 30, 2020.

(51) Int. Cl.
*G05B 13/04* (2006.01)
*G05B 15/02* (2006.01)

(52) U.S. Cl.
CPC ........... *G05B 13/048* (2013.01); *G05B 15/02* (2013.01)

(58) Field of Classification Search
CPC ...... G05B 15/02; G05B 13/04; G05B 13/048; G06N 5/043; G06N 3/006; G06N 3/0454;
(Continued)

(56) References Cited

U.S. PATENT DOCUMENTS 5,467,265 A * 11/1995 Yamada .................. G05B 13/00
706/907
6,745,086 B1 * 6/2004 Pasadyn .................. H01L 22/20
700/121
(Continued)

FOREIGN PATENT DOCUMENTS

WO WO-2020089922 A1 * 5/2020 .......... B01J 19/0033

OTHER PUBLICATIONS

Cabrera, et al. "Towards automation of control software: A review of challenges in mechatronic design." Mechatronics 20.8 (2010): 876-886. Dec. 2010 (Dec. 2010) Retrieved on Mar. 20, 2021 (Mar. 20, 2021) from <https://www.sciencedirect.com/science/article/abs/pii/S0957415810000838>.

*Primary Examiner* — Ronald D Hartman, Jr.
(74) *Attorney, Agent, or Firm* — Van Pelt, Yi & James LLP

(57) ABSTRACT

Possible input value combinations of a prediction of an engineered system are iterated over, comprising, for a possible input value combination: selecting an action to perform on the engineered system for the possible input value combination, comprising: performing a plurality of predictions of the engineered system scored by evaluating an objective function associated with the engineered system and using the possible input value combination and a corresponding plurality of actions. The action is selected from the corresponding plurality of actions, the selection being based at least in part on scores of the plurality of predictions. A rule specifying a corresponding set of one or more rule conditions that is met when the possible input value combination is matched and a corresponding action associated with the rule as a selected action is generated. The generated set of rules to be stored or further processed is output.

20 Claims, 16 Drawing Sheets

(58) Field of Classification Search
CPC .......... G06N 3/08; G06N 3/005; G06N 20/00; G06F 30/367
See application file for complete search history.

(56) References Cited

U.S. PATENT DOCUMENTS

| | | | |
|---|---|---|---|
| 6,993,397 B2* | 1/2006 | Jackson | G05B 13/024 |
| | | | 706/19 |
| 8,855,804 B2* | 10/2014 | Hazen | G05B 15/02 |
| | | | 700/109 |
| 2003/0154061 A1 | 8/2003 | Willis | |
| 2008/0027900 A1* | 1/2008 | Dietrich | G06Q 10/0637 |
| 2008/0177686 A1* | 7/2008 | Buyuktosunoglu | G05B 13/048 |
| | | | 703/2 |
| 2010/0010657 A1* | 1/2010 | Do | G06Q 10/06 |
| | | | 700/103 |
| 2011/0066298 A1* | 3/2011 | Francino | F01K 9/003 |
| | | | 700/289 |
| 2012/0041914 A1* | 2/2012 | Tirunagari | G06F 12/121 |
| | | | 706/15 |
| 2014/0303792 A1* | 10/2014 | Tsuzaki | G06Q 10/06 |
| | | | 700/281 |
| 2015/0148919 A1* | 5/2015 | Watson | G06N 7/01 |
| | | | 700/31 |
| 2015/0286192 A1* | 10/2015 | Morrow | G05B 13/048 |
| | | | 700/29 |
| 2020/0019174 A1* | 1/2020 | Cheriton | G06V 20/58 |

* cited by examiner

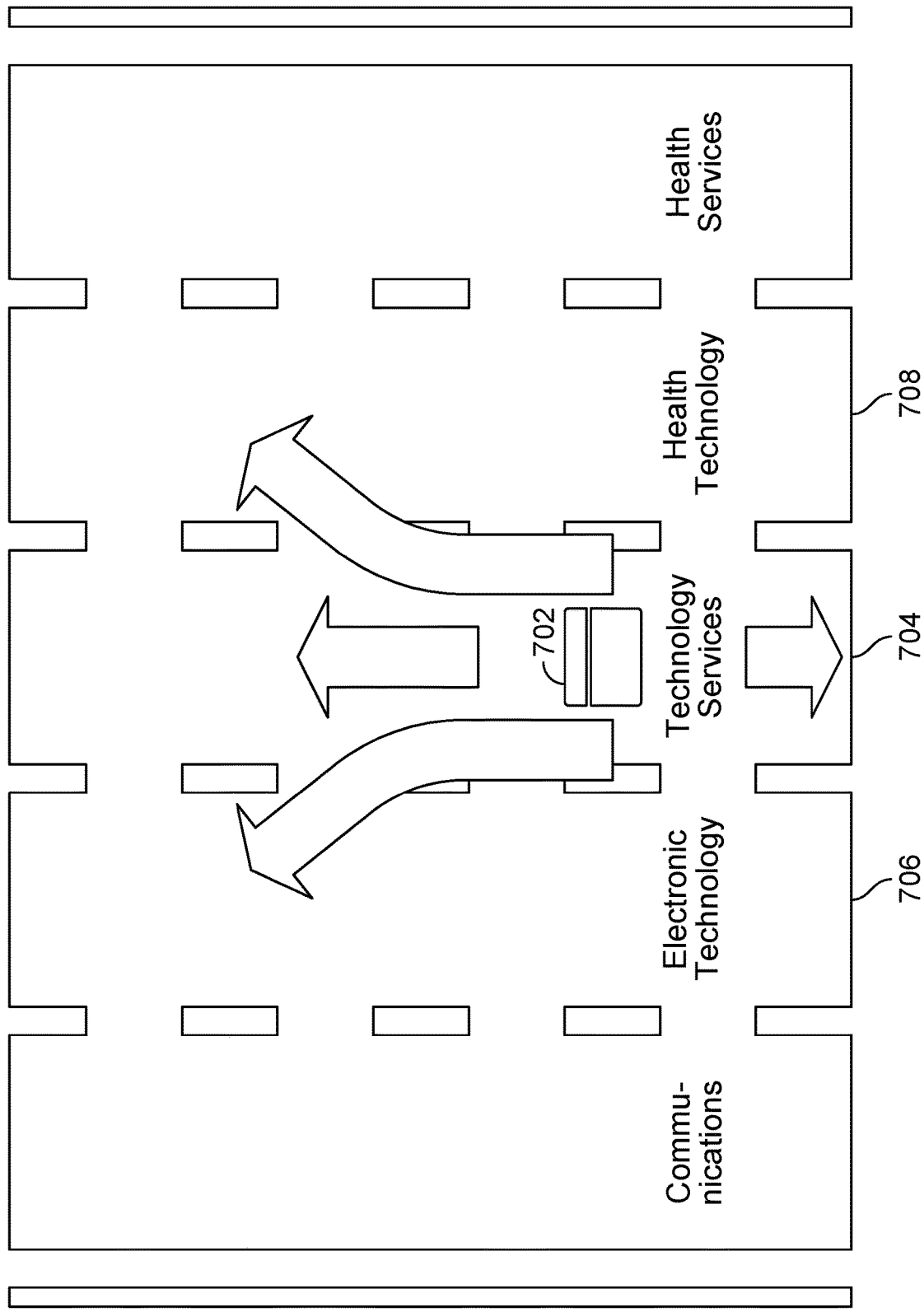

AUTOMATIC GENERATION OF CONTROL DECISION LOGIC FOR COMPLEX ENGINEERED SYSTEMS FROM DYNAMIC PHYSICAL MODEL

CROSS REFERENCE TO OTHER APPLICATIONS

This application claims priority to U.S. Provisional Patent Application No. 62/968,019 entitled AUTOMATIC GENERATION OF CONTROL DECISION LOGIC FOR COMPLEX ENGINEERED SYSTEMS FROM DYNAMIC PHYSICAL MODEL filed Jan. 30, 2020 which is incorporated herein by reference for all purposes.

BACKGROUND OF THE INVENTION

Complex systems are hard for computer logic to control. Self-driving cars and self-driving planes would be important and useful, for example, to reduce labor expense, enhance human safety, and to transport an injured owner closer towards a medical facility. However, the physical environment that cars and planes operate in make it challenging to replace human pilots and drivers with digital logic.

A dynamic environment such as a vehicular roadway presents an immense set of complexities for automatic navigation. Currently it is challenging to generate control decision logic that can effectively wrestle with these complexities. These complexities cause problems because of the cost of computing resources such as processing power, memory, storage, and network resources, and/or slow response in terms of latency and/or throughput.

BRIEF DESCRIPTION OF THE DRAWINGS

Various embodiments of the invention are disclosed in the following detailed description and the accompanying drawings.

FIGS. 7A, 7B, and 7C illustrate an example of hierarchical lanes for stock trading.

DETAILED DESCRIPTION

Figure 1:
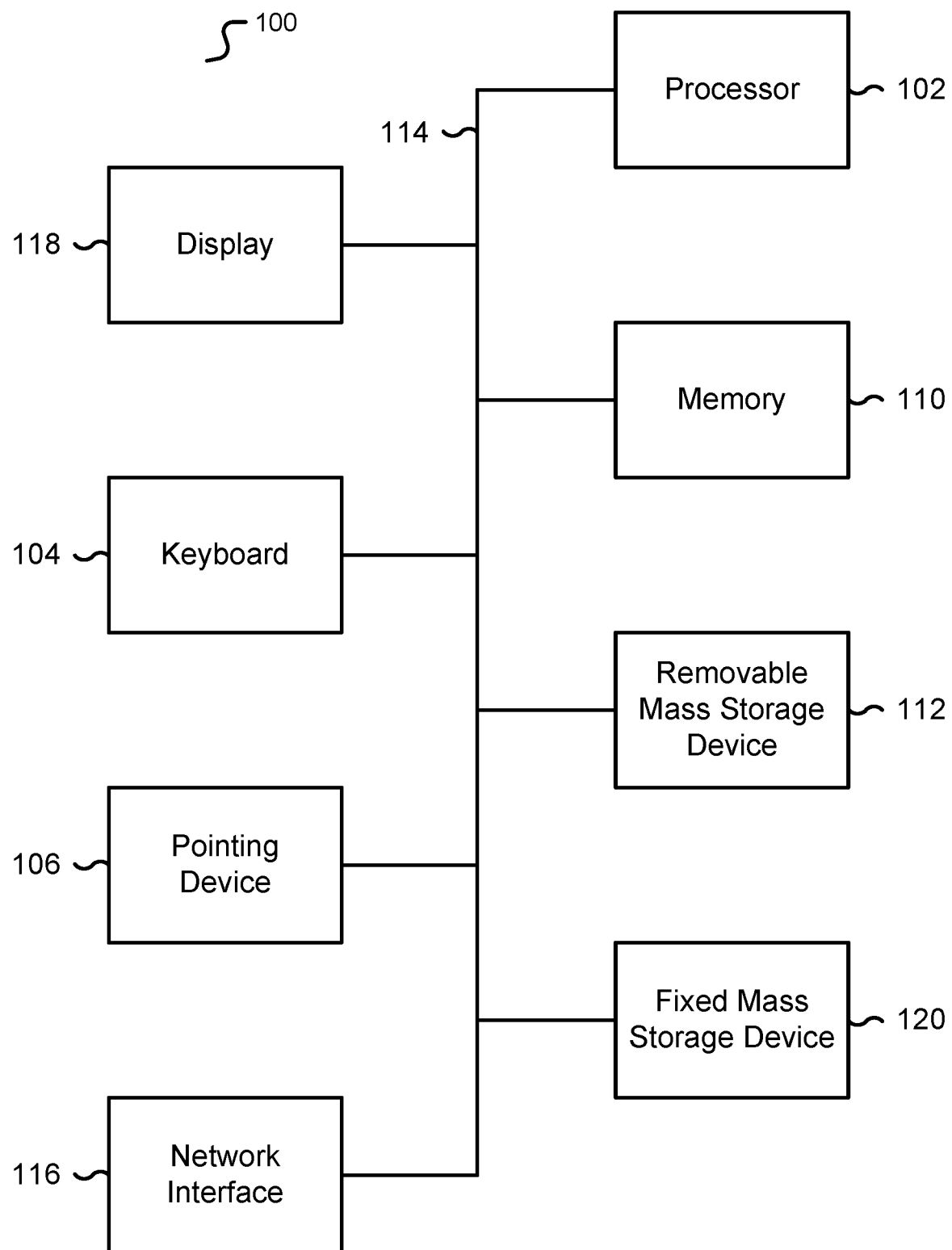
FIG. 1 is a functional diagram illustrating a programmed computer/server system for automatic rule generation in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic generation of control decision logic for complex engineered systems from a dynamic physical model is disclosed. As used herein, engineered systems refer to systems that have been engineered to provide predictable behavior for human operators, for example the engineers of a car or an airplane. As part of the engineering of these engineered systems, a dynamic physical model may produce acceptable and predictable behavior. Leveraging the dynamic physical model used to synthesize these engineered systems in the automatic generation of logic to control these same systems is disclosed.

In some embodiments, the dynamic physical model includes a digital simulation package, for example a flight simulator, and may include an objective function capturing design requirements that give a quantitative indication of how preferable a result is. Using the simulator and the objective function for automatic generation of logic to control is disclosed.

Refining automatic generation of control decision logic using discretization is disclosed. For example, while digital computers have the ability to set an airspeed to extreme precision, for example 300.0 knots, 300.1 knots, 300.2 knots, a human pilot does not necessarily fly a plan with such precision and subsequently the engineered system of a plane allows pilots an objective of a stable flight with much less precision. Reducing this precision using discretization by many orders of magnitude, for example flying a plane with a handful of speeds including taxi speed (~50 knots), takeoff speed (~500 knots), and cruising speed (~350 knots), may be sufficient for control of important piloting scenarios.

Refining automatic generation of control decision logic using pipeline staging is disclosed. For example, driving a car from a home to a theatre may embody different goals. Pipeline partitioning may address each of these goals: a long-term/strategic goal of determining current traffic congestion and highway closures to determine a chosen path; a short-term/tactical goal for driving along the chosen path and dealing with road blocks, traffic jams, or emergency vehicles; and a near-immediate/responsive goal for avoiding a child darting out in traffic or a truck cutting the car off abruptly.

Refining automatic generation of control decision logic using a pruning function is disclosed. There may be control system logic that may seem extraneous or "dumb" for a human operator to consider which may be pruned with such a pruning function. For example, if sensors detect an airplane is flying below a desired altitude, control variables that include lowering the elevators by a little, lowering the elevators by a lot, and lowering the elevators by a maximal amount all would lower the nose of the airplane and further reduce altitude, and thus may be pruned without further consideration.

FIG. 1 is a functional diagram illustrating a programmed computer/server system for automatic rule generation in accordance with some embodiments. As shown, FIG. 1 provides a functional diagram of a general-purpose computer system programmed for automatic rule generation in accordance with some embodiments. As will be apparent, other computer system architectures and configurations may be used for automatic rule generation.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general-purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as is well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storages (112), (120) generally store additional programming instructions, data, and the like that typically are not in active use by the processor (102). It will be appreciated that the information retained within mass storages (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fiber Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example, a script that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

An engineered system described herein is designed to operate according to a dynamic physical model. For example, a refrigeration system operates by the usual refrigeration principles, simplistically stated as: running the compressor gradually reduces temperature in the refrigerated space by transferring its heat out. Many engineered systems are analog systems because the real world is continuous. Refrigeration is an example because the temperature and pressures produced by the compressor are continuous values.

The engineering of such a system entails providing components with known capabilities and power requirements. Therefore, for a given space to be cooled and a given refrigeration system, if its heat gain characteristics from the external environment and starting temperature are known, a computer simulation can be used to receive one or more inputs and predict with some level of accuracy the effect of running the refrigeration compressor for a given period of time T. In essence, an engineered system may require a dynamic physical model that allows its performance to be predicted both in terms of dynamic capacity and resource requirements. Otherwise, a system may not have predictable performance and cost, which is unacceptable in most applications.

An engineered system can also have an objective function, for example a measure of how well it is achieving its desired goal/design requirement. In the example case of a refrigeration system, the objective function is, informally, a measure of how well it is maintaining the temperature within a specified range with the minimal amount of energy and wear on the equipment and/or providing maximal comfort to humans or other items within the refrigerated spaces. It is normal as part of designing an engineered system to have an objective function and develop a dynamic physical model, often as a computer simulation, that corresponds to the design and then evaluate its performance relative to an objective function to see if the design is adequate to meet requirements. Such a computer simulation may have an API (application programming interface) or other interface to allow a third-party apart from the design team to model the system.

In the case of the simple example of a refrigeration system, the control logic is simple, namely turn on compressor power if the temperature is too high, and turn off compressor power if the temperature if sufficiently low. However, for control systems in more complex environments with more control variables, generating a control algorithm is far more complex. For example, the control algorithm for flying an airplane involves more degrees of freedom, more control variables and more complex behavior of the controlled system plus significant complications by the environment, such as wind, dynamic obstacles, and so on. Still, there is an objective function that may be applied, namely maintaining the desired trajectory in the absence of obstacles and avoiding the obstacles when present. Another example is controlling an autonomous land vehicle. The same characterization for flying an airplane applies to controlling an autonomous vehicle, although there are often more obstacles, and more obstacles in closer proximity, to be concerned with as part of the control.

One traditional approach for these complex control systems is writing control software manually in imperative code (using statements to change a program's state, such as C++) which may lead to complex code that is expensive to develop, maintain, and extend. It is also error-prone and difficult to test: there are an enormous number of possible scenarios, far beyond a practical number to cover in a test sequence. For example, consider the essentially infinite number of scenarios that an autonomous vehicle may encounter in terms of input variables, even if restricted to on-road driving. Therefore, realistically, testing may only cover an extremely small percentage of the possible scenarios.

Another traditional approach is to use so-called machine learning to effectively automatically generate the control software, using a neural network-based implementation. This approach reduces the development cost down to the cost of coming up with a training set of scenarios and then training the neural network against this set. However, the training set itself is an infinitesimally small portion of the possible scenarios so the training achieves the equivalent of very limited testing.

Moreover, the resulting control network is a "blackbox" in the sense that its behavior is unpredictable except for inputs that exactly match one of the training sets of inputs. For instance, there is no means of identifying boundary conditions against which to test. By contrast, with a manually generated procedure, if it contains an "if" statement such as:

if(temperature>limit) {doAction1( );}
   else doAction2( );

the testing may be divided into these two cases of the temperature being greater than the limit and the temperature being less than the limit. If there is no other dependence on the temperature in the control software, it is sufficient to test with two values of the temperature, namely above the limit or below, at least to verify what the control software does in these two cases. There is no need to test all the values of temperature. With a neural network of some complexity, it is infeasible to identify these boundary conditions and the dependence between inputs because the outputs are a complex function of weights and floating point inputs.

The control actions possibilities of a complex control systems are often quite simple, especially when designed to be operated by a human. For example, with an autonomous land vehicle, the controls are essentially just the steering angle, the throttle position, and the brake position. Therefore, the real complexity of a control system is in the decision logic which decides how to set the control variables that control these actions, for example what is a suitable steering angle to select given the input conditions. Automatically generating the control decision logic for a complex engineered system when there is a computable objective function is disclosed.

Figure 2:
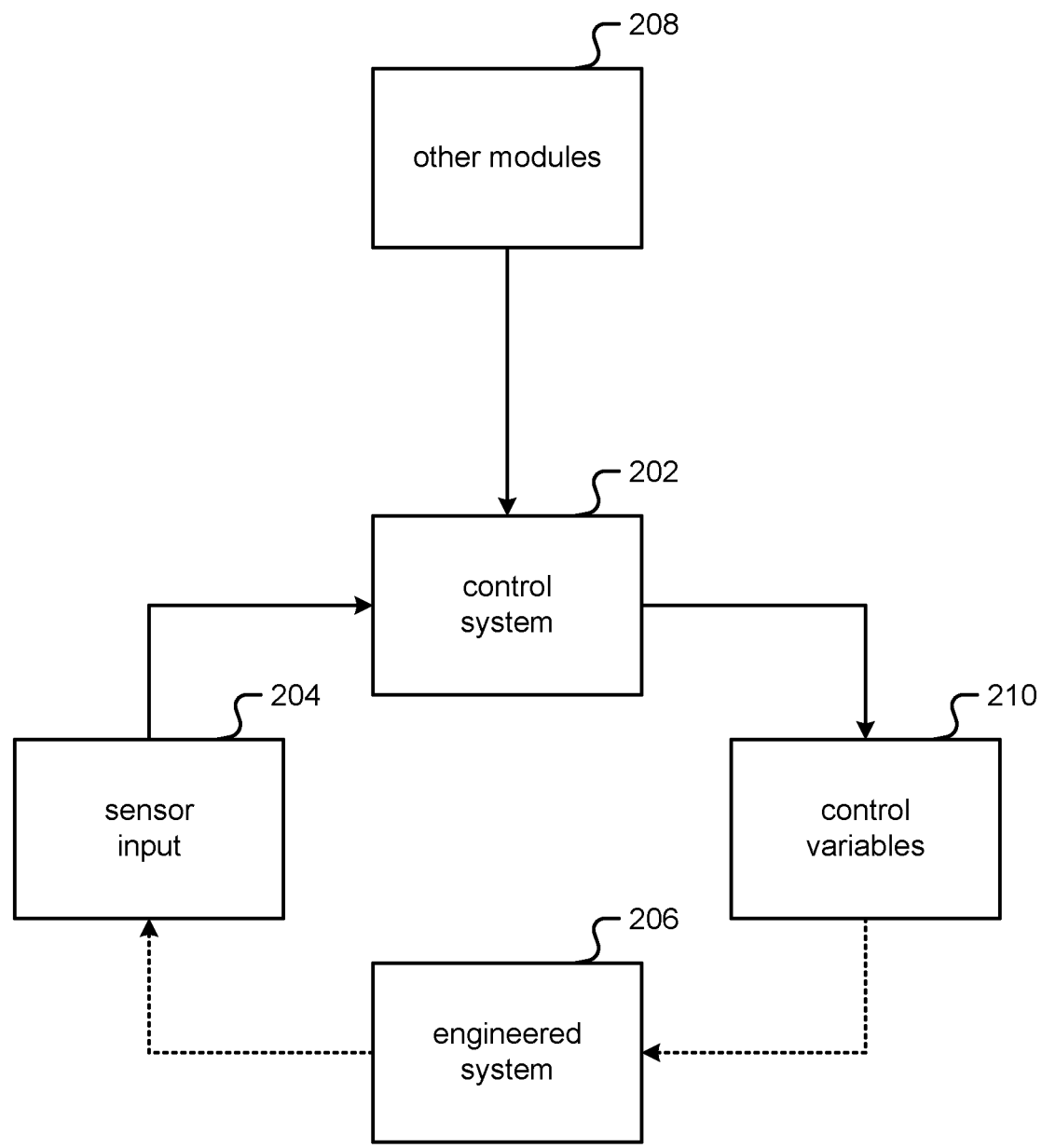
FIG. 2 is a block diagram illustrating an embodiment of a control system.

FIG. 2 is a block diagram illustrating an embodiment of a control system. In one embodiment, the control system (202) of FIG. 2 is a computer system as shown in FIG. 1. As shown in FIG. 2, the control system (202) accepts inputs from sensors (204), the current system (206) state and other modules (208) such as operator command input and configuration files, decides on an action and outputs this action(s) to the actuators by the setting of control variables (210).

Figure 3:
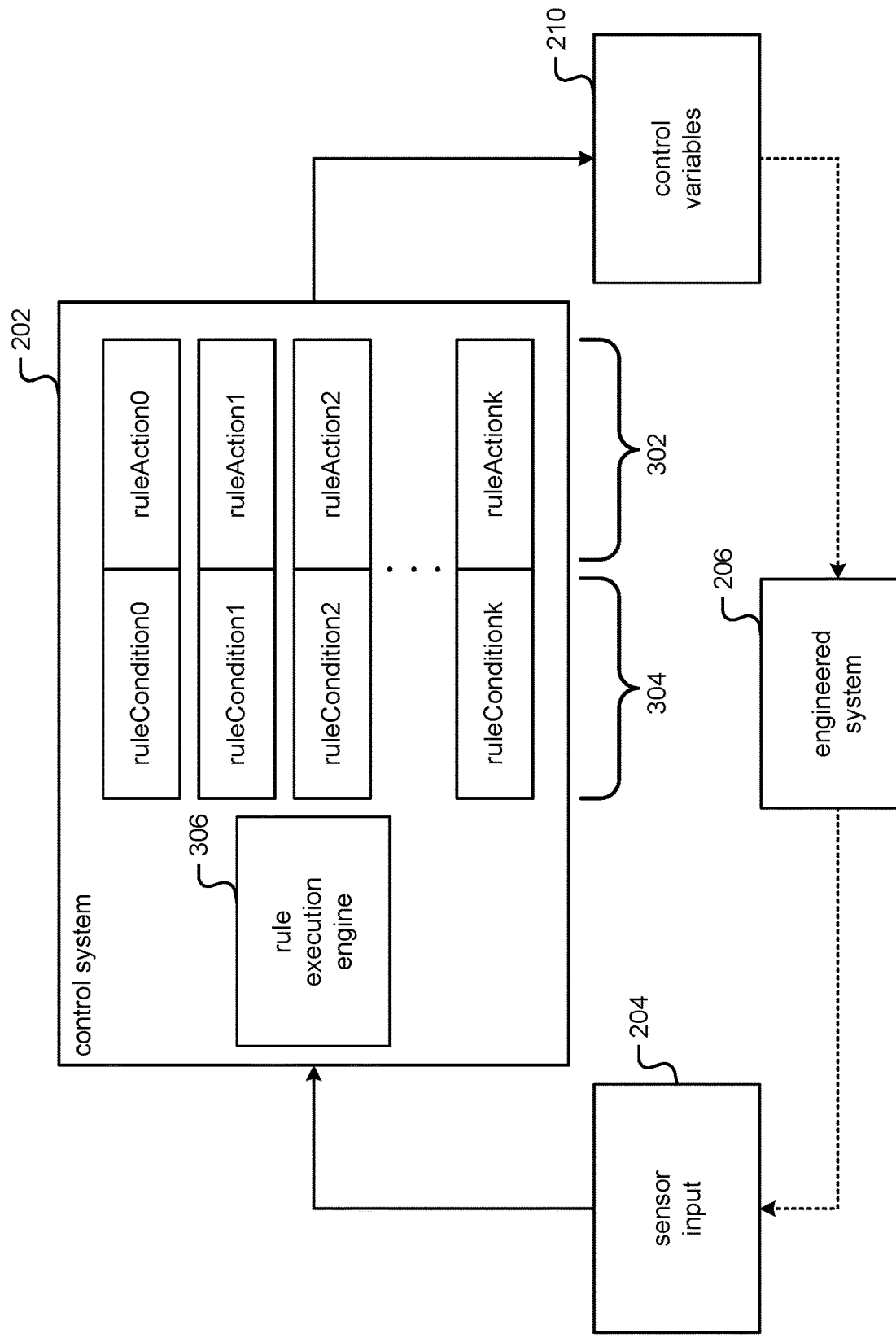
FIG. 3 is a block diagram illustrating an embodiment of a rule-based system.

FIG. 3 is a block diagram illustrating an embodiment of a rule-based system. In one embodiment, the control system (202) of FIG. 3 is the control system (202) of FIG. 2. As shown in FIG. 3, a rule set specifies an action(s) (302) to perform by the control system in response to a particular condition(s) (304), when that condition is matched against a rule condition, for example by a rule execution engine (306). A particular condition may be an input value combination, taking input from sensor inputs (204), state of the engineered system (206)/control system (202), and/or other modules (208 in FIG. 2). The action may be realized by the setting of control variables (210), for example the setting of a setpoint of a PID (proportional-integral-derivative) controller governing throttle of an aircraft (206).

In FIG. 3, the rules governing the decision logic of a control system (202) may be automatically generated in advance of the execution of the control system (202). These rules may then be used to implement the control system (202). In various embodiments, this implementation may use a conventional rule execution engine (306), a table matching implementation, source code compiled from the rules into an "if . . . else" structure that evaluates the rule conditions and executes the associated actions, and/or any other appropriate implementation.

Reactive Rule Engine. Similarly, a rule engine normally repeated polls the entire rule set to check for rule conditions that are true, in order to detect that a rule action may be triggered. However, this approach suffers from the typical trade-off between the overhead of rapid polling and delay to detect conditions that may trigger actions. In particular, higher frequency polling to minimize delay in triggering an action introduces significant overhead whereas lower frequency polling to reduce this overhead increases the delay to trigger after a condition becomes true. An alternative approach supported with explicit rule condition code is to have a reactive implementation in which an input attribute change triggers an immediate re-evaluation of the rule conditions that are dependent on this input. Thus, the action may be performed without delay if the rule condition for that action has now become true. Such a reactive implementation is described below.

Reactive Rule Engine Implementation. A rule engine traditionally repeatedly polls an entire rule set to check for rule conditions that are true, in order to detect that a rule action may be triggered. However, this approach suffers from a typical trade-off between the overhead of rapid polling and delay to detect conditions that may trigger actions. In particular, higher frequency polling to minimize delay in triggering an action introduces significant overhead whereas lower frequency polling to reduce this overhead increases the delay to trigger after a condition becomes true. An alternative approach supported with explicit rule condition code is to have a reactive implementation in which an input attribute change triggers an immediate re-evaluation of the rule conditions that are dependent on this input. Thus, the action may be performed without delay if the rule condition for that action has now become true.

In one embodiment, a compiler outputs code that implements a reactive rule engine. It may be reactive in the sense that it directly reacts to input changes and performs the actions associated with rule conditions that have become true as a result of the input change, if any.

Figure 4:
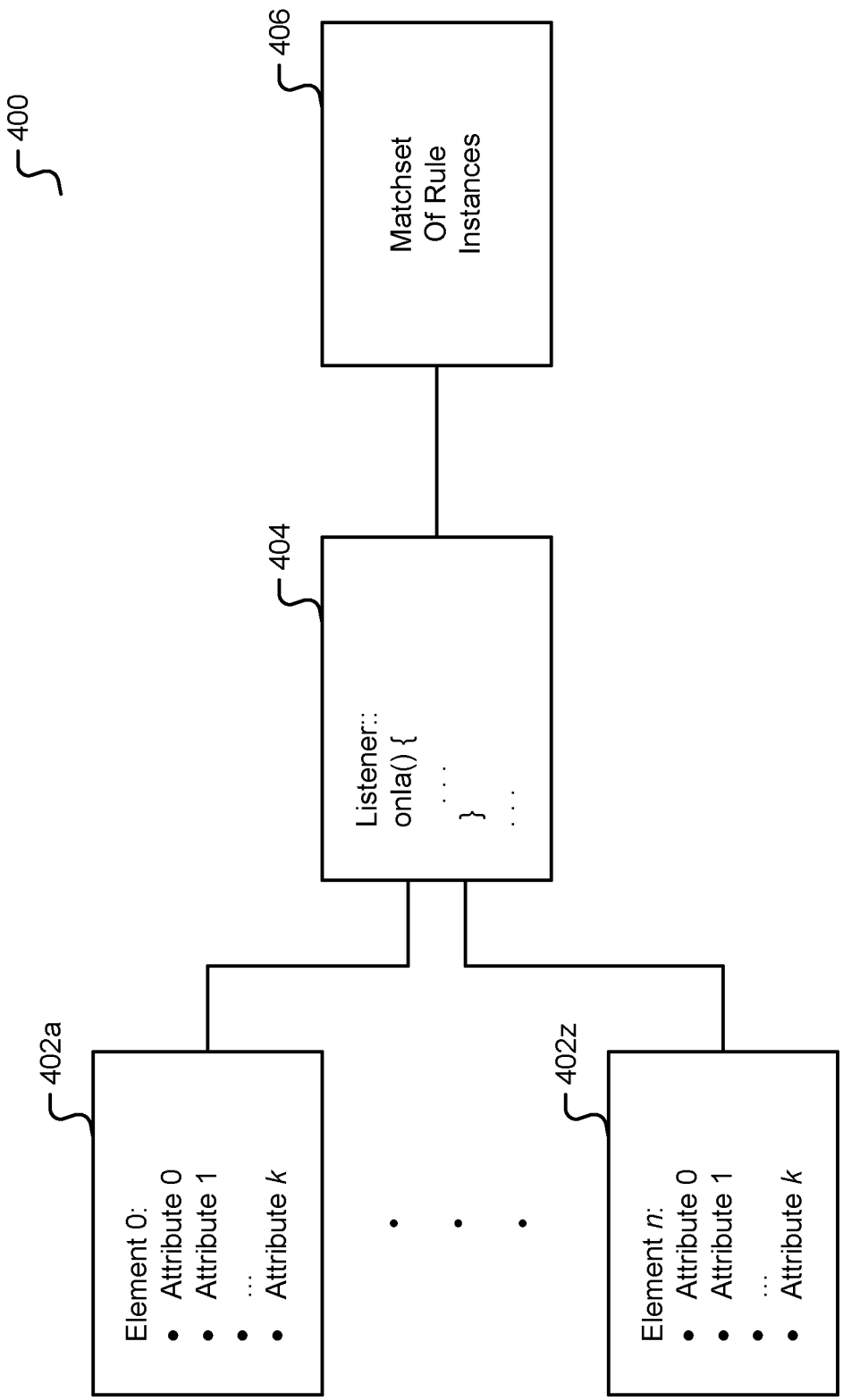
FIG. 4 is an illustration of an embodiment of a reactive rule engine.

FIG. 4 is an illustration of an embodiment of a reactive rule engine. In one embodiment, the reactive rule engine is realized as a "listener" module (404), as shown in FIG. 4. The "listener" or equivalently "observer" (404) is a traditional software design pattern in object-oriented programming. In essence, a listener (404) is a module that is notified by a callback when some attribute of interest in one of the "listened-to" objects (402) has changed. Thus, the listener (404) reacts to element attribute (402) changes, adding a rule instance to the matchset (406) if the rule condition is true.

There are established techniques for manually implementing a listener module in C++ and other languages. Overall, in one embodiment, the compiler portion generates the code for the element types and callback notifications using other techniques, including those disclosed in U.S. patent application Ser. No. 12/154,354 entitled DYNAMIC COLLECTION ATTRIBUTE-BASED COMPUTER PROGRAMMING LANGUAGE METHODS filed May 21, 2008 which is incorporated herein by reference for all purposes. It further generates a listener module (404) using the techniques in U.S. patent application Ser. No. 12/154,399 entitled NOTIFICATION-BASED CONSTRAINT SET TRANSLATION TO IMPERATIVE EXECUTION filed May 21, 2008 which is incorporated herein by reference for all purposes, with a callback procedure for each callback notification, namely for each modifiable attribute that is required for evaluating an observable subcondition. In this context, a rule may be regarded as a constraint between the model and a matchset of action labels that requires the action label for the rule to be in the matchset collection if the rule condition is true.

In one embodiment, the listener module (404) is generated to listen to each input attribute of each element (402a, 402b, . . . 402z) that is instantiated in the model. Thus, in C++ terminology, the compiler defines a class with a data member that points to each element to which this module needs to listen or react, either as a single pointer or as a collection of pointers if there are multiple such elements of the same type. For each input attribute ia, the compiler also generates a callback function "onIa( )". Following standard practice in C++, this callback may be in a separate class that is a derived class of the callback interface, which then calls into the actual main listener module class. The callback function is generated with code to evaluate each of the rule conditions specified in the model that is affected by this input attribute ia changing. Consequently, when attribute "ia" changes, this Listener::onIa( ) (404) procedure is invoked. This procedure evaluates the rule conditions that are dependent on this input and outputs the action labels for each rule condition that evaluates to true (406).

Note that especially with more complicated rules, the relationship between objects clarify and/or indicate connections. The compiler also generates the necessary data members and collections in the listener module to allow these rule conditions to be evaluated. For example, in one example of a computer network model, the rule condition corresponding to a broken link in a physical network needs to know the "other" interface, the one at the other end of the link, to evaluate the rule condition as illustrated by the following code:

```
otherInterface=getOtherInterface(notifier( ));
if(notifier( )→lossOfSignal( )&&(otherInterface→lossOfSignal( )) {
    indicateCableBreak( );
}
```

In the above, "notifier" corresponds to the interface element that is performing the callback and otherInterface is the interface to which it is connected (indirectly through Link and Unilink objects), as returned by getOtherInterface. Thus, the compiler may generate code to store and maintain a collection in this listener module that may hold the connected interface pairs. Consequently, when the above condition is to be evaluated as part of executing this callback function, the "otherInterface" variable in the above code is set to the interface that the "notifier" interface is connected to by accessing this collection.

Note that an input attribute is specified as input in the model but may be a complex calculation from actual system inputs. For example, an input attribute may be a weighted moving average of some raw sensor value that is only updated when the average changes by a significant amount. Thus, the actual input may be changing more frequently and with more significant changes that the input attribute used in the model.

In one embodiment, the listener module (404) is realized as a derived class (in C++ terminology) of a base class that defines and implements the action procedures. For example, the actions may be manually specified in C++ as follows:

```
class ActionModule {protected:
    void        indicateCableBreak(Interface*intf0,
        Interface*intf1);
    void indicateUndirectionalCableBreak(Interface*intf0);
    . . .
}
```

The procedure bodies may be specified separately as is typical practice in C++. Then, the rule model may be generated as a derived class of this ActionModule, e.g.

```
class RuleModule:public ActionModule {
    . . .
}
```

That is, the (generated) RuleModule is a derived class of the ActionModule which may be explicitly programmed so it is able to access the "protected" action procedures provided by the latter module. Then, the rule evaluation code may be generated for each input attribute as described earlier, and the calls to the action procedures just invoke those specified in the ActionModule, which is incorporated by inheritance into the Rule Module.

In one embodiment, selected portions of the listener module code may be provided by manual programming. For example, by specifying "external" in a rule condition, the automatic generation does not generate a rule condition for that rule, but instead assumes/relies on manually specified code that handles this condition. This provision recognizes that there often a need for a few special optimizations for a particular application that are beyond that supported by the compiler.

Figure 5:
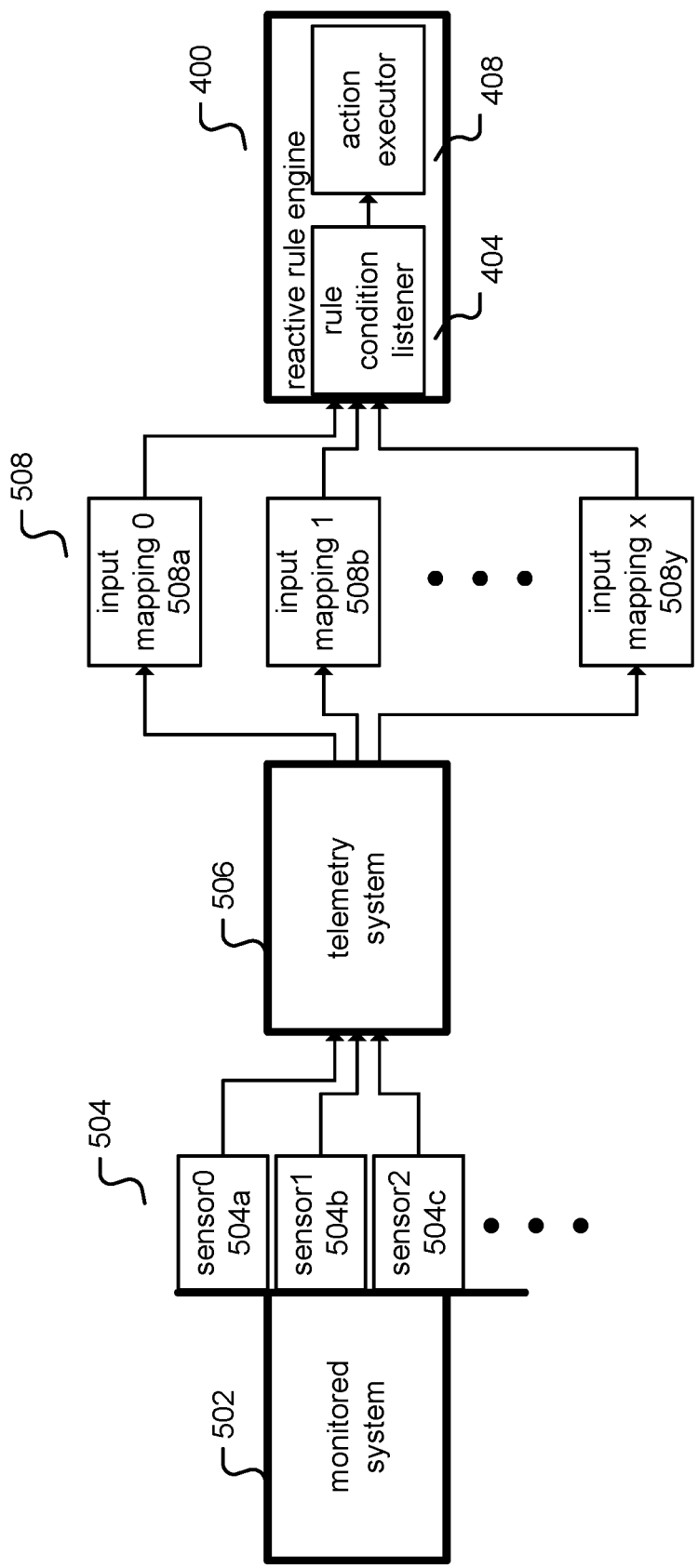
FIG. 5 is an illustration of an embodiment of a reactive rule engine in a monitored system.

FIG. 5 is an illustration of an embodiment of a reactive rule engine in a monitored system. FIG. 5 shows how the reactive rule engine (400), structured as a listener module (404) and an action execution module (408), is connected to a monitored system (502 to 508). In FIG. 5, sensors (504) provide measurements of values associated with the monitored system (502), such as temperature, humidity, bearing, velocity, and so on. These values are collected by a telemetry system (506) that delivers these values for input processing (508), which may take several actions on the inputs. For example, it may translate the sensor input values from one measure to another, such as from A/D units to temperature in Celsius. It may also interpolate or extrapolate sensor values in the case of missing values or smooth or correct sensor values in the case of spikes or erroneous values that may be due to sensor transients. In that vein, it may provide a computed value from the inputs, such as a weighted moving average on some input. It may also discretize the input stream into a small number of discrete values defined by thresholds, such as for example cold, cool, warm and hot for a temperature reading. Thus, the reactive rule engine (400) is only reacting to changes of temperature that cross a threshold. Finally, it may withhold input values from the listener (404) until some specified period or round, to support periodic polling for rules, rather than reacting to each input changes, as described later. That is, mapping may restrict the reactive rule engine to only reacting to threshold crossings to reduce noise, withhold input value to reduce noise, and so on.

In one embodiment, if multiple rule conditions are dependent on the same input attribute, the compiler generates these rule conditions in the same callback function.

To recognize a rule condition in the matchset that is no longer valid, a periodic process may test the set of matched rule conditions and delete it from this collection if it is no longer valid and/or when an element "bar" changes, it may prompt the re-evaluation of any rule condition (RC) in the set that is dependent on this element. In an embodiment in which only a single independent rule condition should be true at any time, the matching to a different rule condition may immediately delete the existing rule condition, if any, from the match set.

In one embodiment, as an optimization, the compiler may recognize the case of objects in the model that exist entirely for const rules and do not correspond to any inputs. For example, a cable in the network typically has no sensors on it, and thus is modeled without input indicators. It exists only to provide a context to specify one or more rule conditions and their implications. In these cases, the compiler may optimize these objects out by collapsing the relationships so the evaluation takes place directly to the objects with observed symptoms. For instance, in the example of a computer network, the Link and Unilink objects may be optimized out and the interconnection between interfaces may be recorded directly in the Interface objects. In particular, with this optimization, an interface contains an attribute "otherinterface" which points to the interface it is connected to. In the special case of a relationship like "parent", the parent is easily determined from the component element by the usual parent back pointer.

A non-binary relationship may be decomposed into binary relationships, so the above approach may be used to handle ternary relationships/parameters as well. When the reactive rule engine software is initially executed, the generated objects may be instantiated with initial values for the input attributes that do not occur in practice. The rule engine process and these input attributes may then be connected to the actual telemetry which causes these input attributes to be changed to different values, causing the reactive behavior to match the rule conditions as described earlier, and then invoking the relevant rule(s), if any.

In one embodiment, the compiler optimizes the generated code in the callback function to reduce the execution time and the code size. For example, in the above code snippet, if another rule condition requires the "otherInterface", the generated code is optimized to access this value once from the above collection and use this value for both rule conditions.

As another candidate optimization, the subexpression involving this notifying input attribute may be tested first before performing actions necessary to evaluate the rest of the rule condition. For example, the above code snippet may be optimized as follows:

```
if(notifier( )→lossOfSignal( )) {
    otherInterface=getOtherInterface(notifier( ));
    if(otherInterface→lossOfSignal( )) {
        indicateCableBreak( );
    }
{
``` where getOtherInterface is a procedure that returns the other interface.

Nesting the getting of the otherInterface within an "if" block means that getOtherInterface procedure call is only executed if the notifier's lossOfSignal attribute is true. In the expected common case, this attribute may be false, thereby saving the cost of this call A further optimization is to recognize common subexpressions in the rule conditions that are being evaluated. For example, the rule condition corresponding to unidirectional cable break corresponds to loss of signal at one end but not the other. That is,

```
if(notifier( )→lossOfSignal( )) {
    otherInterface=getOtherInterface (notifier( ));
    if(!otherInterface→lossOfSignal( )) {
        indicateUndirectionalCableBreak( );
    }
}
```

By recognizing common subexpressions, this rule condition may be optimized as per the following code:

```
if(notifier( )→lossOfSignal( )) {
    otherInterface=getOtherInterface (notifier( ));
    if(otherInterface→lossOfSignal( )) {
        indicateCableBreak( );
    }
    else {
        indicateUndirectionalCableBreak( );
    }
}
```

In one embodiment, the compiler may determine that one or more arguments for rule expression may be determined from attributes in one or more of the elements. For example, in the running example of a network, an Interface instance may have a pointer to the Unilink instance to which it is connected and the Unilink instance may have a pointer to the Interface to which it is connected. Plus, the interface necessarily specifies an inverse relationship, such as the connectedToBy relationship in the Interface. Therefore, the compiler may generate a C++-like implementation of the getOtherinterface as:

```
Interface::Ptr
getOtherInterface(intf) {
    auto unilink=intf→connectedToBy( );
    return unilink→connectsTo( );
}
```

This procedure follows these pointers to return the "otherInterface" using the state in these network elements rather than having a separate collection of interface pairs, thereby avoiding the associated state overhead.

In one embodiment, the referenced attribute is a collection. For example, in a broadcast network, an interface may be regarded as being connected to multiple different interfaces. In such a case, the rule condition may be evaluated in an iteration loop, where the value of "otherInterface" is set to the next other interface for each iteration of the loop.

In one embodiment, an element type may be defined as a derived type of another element type, similar to the inheritance mechanism in most object-oriented languages. A derived type may add additional subconditions over those in the base type. It may also extend or override the subcondition implications provided in the base type. In a particular case, a derived type subcondition may correspond to an extended or refined version of a rule condition in the base type. Such a derived rule condition may extend or refine the observed subconditions of the base rule condition. For instance, a base rule may specify its rule condition to imply observed subconditions SC0 and SC1, so its condition expression is:

(SC0 && SC1)

whereas the derived rule may specify subcondition implication that further leads to SC2, so its condition expression is:

(SC0 && SC1 && SC2)

In one embodiment, a rule condition may be specified in the same type by specifying that it "extends" an existing rule condition, allowing a derived rule condition to be defined in the same element type as the base rule condition.

The derived versus base rule conditions may be used to effectively specify partial matching of subconditions. Or conversely, it may be used to avoid the case of a rule condition failing to match when one or more subconditions are missing even though the intended scenario is very likely the case. For example, a base rule condition for an object being a stop sign may be having the observed subcondition of being octagonal as well as being red. A derived rule condition may specify the additional subcondition of the sign being inscribed with the word "stop". An object may still be recognized as a stop sign even if the inscription may not be read yet recognized with greater confidence as a stop sign if the inscription may be read. The derived relationship between these rule conditions provides an indication to suppress the match to the base rule condition when the derived rule condition is matched.

In one embodiment, the compiler may automatically generate derived rule conditions based on inference, that is back propagation of subconditions, as described above as back propagation of symptoms. In particular, the compiler may add observed subconditions in a derived rule condition that may be false, thereby disambiguating the specified rule condition from other rule conditions that otherwise overlap in the observed subconditions that cause them to trigger.

The optimizations described above may be used to optimize the code for handling the base condition and the derived condition(s) evaluation. In the simple case, the code is structured as:

```
if(<baseCondition>) {
    if(<additionalDerivedCondition>) {
        performDerivedAction( );
    }
    else {
        performBaseAction( );
    }
}
```

That is, the derived rule condition is evaluated only if the base rule condition holds.

In one embodiment, the action mapping/conflict resolution recognizes the case of both the base and derived actions labels being present and only executes the action associated with the most derived rule condition.

In one embodiment, an input subcondition may be defined as an expression in terms of actual input attributes. For example, rather than the Switch::lossOfSignalIn Boolean input attribute, a switch may have a Switch::signalInLevelattribute. Then, loss of signal from input is indicated by the expression switch→signalInLevel( )<minSignalLevel( )

In the model, this may be expressed as:

```
lossOfSignalIn:Subcondition {
    =signalInLevel( )<minSignalLevel( );
}
```

In one embodiment with input subcondition expressions, the compiler, as an optimization, generates code such that it performs the check that the subcondition associated with the notification is true on notification before performing the associated rule evaluation. That is, as an example, if notified of a change in the signalInLevel, the callback returns immediately if the value greater than or equal to "minSignalLevel".

In one embodiment as above, the compiler, as an optimization, generates code that evaluates this input subcondition before invoking the callback and only invokes the callback procedure if true.

The method used by the compiler to generate the rule evaluation code may be described as follows:

for each rule condition RC {
  1. follow the implication of subconditions from rule condition RC to generate a set of observable subconditions (OSCs), the observable subcondition set (OSS).
  2. for each observable subcondition OSC in OSS {
  2.1 for each input/notifying attribute IA in OSC {
    2.1.1 find the callback procedure body data structure for the "onIa" procedure,
      declaring this callback procedure if not already declared.
    2.1.2 find an existing "if-else" statement in this procedure that tests the subcondition associated with IA.
    2.1.3 if not found, instantiate this "if-else" statement
    2.1.4 embed the rest of the subconditions in OSS in the "if" block if a true subcondition
      and otherwise in the associated "else" block.
    2.1.5 insert the action or action label in the resulting block that is entered
      if this condition evaluates to true.
    }
  }
}

Step 1 populates the OSS. In one embodiment, the OSS is represented as a directed acyclic graph (DAG) with the leaves of the DAG associated with rule condition RC.

In Step 2 above, the standard compiler technique of having an internal data structure representation of an "if" and "else" statement is assumed. Moreover, OSS is just a data structure representing the logical conjunction of the subconditions, similar to the parse tree structure found internal to many compilers. With this representation, additional statements may be added to the body of an "if" statement in the same way as such a data structure is normally built up by parsing input. The primary difference is that rule condition is embedded in an "if" or "else" statement that is conditioned on input attribute IA rather than being placed exactly as dictated by the parsed input as in a normal programming language. Also, the compiler needs to determine the access path to other values required to evaluate the rule condition, e.g. in our network example, determine how to access the "otherInterface". However, this access path may be determined by the relationships across which the current rule condition transits to this subcondition and the relationships from the current rule condition to these other subconditions. In particular, for each other subcondition SCi, it uses the inverse relationships to access back to the rule condition scope and the implication relationships to these other subconditions to build a path to access the data required for each subcondition. In one embodiment, the compiler has to evaluate the access path, in part to find the other interface. Thus, the compiler may use the DAGs to determine this access path through inverting relationships.

The steps to generate the code for finding the corresponding element or elements for a given argument to a condition are:

a. make the input subcondition be the current subcondition
  b. find the inverse relationship for the relationship across which the current subcondition is implied. (The inverse relationship is indicated as such in the model, as illustrated by the connectedToBy relationship specified in FIG. 2.)
  c. generate code that processes each element in this inverse relationship as follows (either a "for" loop if a collection or an "if" condition if a singleton (to allow for this singleton being null)):
    i. get the subcondition that implied the current subcondition, if any. There is often a single such subcondition, so this is specified as such in the code in these cases.
    ii. follow the implying relationships across which this subcondition implies, forward to the input attributes, excluding the relationship corresponding to the inverse relationship just traversed. (In the "otherInterface" case, there is no other relationship except for the case of the rule condition itself.) Record the input attribute values to use as arguments to the condition.
    iii. if this subcondition corresponds to a rule condition, the argument generation is complete.
    iv. otherwise, invoke this procedure recursively on this subcondition.

For instance, in the case of the example computer network, the input attribute of "lossOfSignalInEth14" is known to be implied by interface named "eth14" from the "lossOfSignalIn" subcondition. The latter has no other implications. The inverse relationship to that implying this subcondition is the connectedToBy attribute, which then provides the in-bound Unilink object. The Unilink::lossOfSignal subcondition has an inverse relationship that is implied by the Link::cableBreak subcondition which is a rule condition, thus terminating the back propagation across inverse relationships. This rule condition implies across the components of Link that are of type Unilink. Because there are two such components, it is evident that there is a single "other"

component, namely the other Unilink instance, given one may correspond to the relationship that is inverse to the other to get to this rule condition. Doing forward traversing on this "other" Unilink component yields the "other" interface to which this Unilink component is connected, which is the argument required in this case for condition evaluation. The generated code may be optimized to bypass the Link level and recognize the connectedTo Unilink instance as the inverse containing the pointer to the "otherInterface". The result is code that finds the "otherInterface" by a minimal number of memory references.

This same internal compiler data structure representation of this generated code may be used to perform various optimizing transformations to reduce the code size and improve execution performance using standard compile optimization techniques as well as others made possible by the structure and specification in the model.

The implementing of the rest of the subconditions described in the above sequence includes generating code to access the values used by these other subconditions, along the lines described for the "other Inter face" in the earlier examples.

In one embodiment, the model is expressed in a general-purpose object-oriented language in which the concept of a subcondition, and subcondition implication have been added. In another, a rule construct is added and the implications are indicated as Boolean expressions. The compiler is then extended to perform code generation on these rules, subconditions and implications, as described above.

To avoid excessive callback overhead, an input value may be discretized in the input attribute to a condition so that notification only takes place when the value crosses some threshold relevant to the condition. For instance, if a condition specifies the temperature as being hot as a subcondition, the temperature sensor may provide a discretized attribute that indicates only "hot" or "cold". Thus, a notification does not occur on each minor change in temperature but only when the input value changes from "cold" to "hot".

Polling and Polling Optimization. In some applications, a reactive execution of a rule engine incurs excessive overhead because of the rapid change in input values, most of which not leading to any rule triggering. For example, in some applications the rules only need to be invoked when a condition persists for some time rather than only occurring transiently, so rule triggers rarely occurs and/or the vast majority of the reactions do not result in useful processing. After a rule is triggered, the condition that indicates triggering tends to persist until the condition is substantially changed. With this assumption, it is not necessary to react to every input change. Instead, the rule engine may periodically re-evaluate the rule conditions rather than reacting to every input change. In one embodiment, the rule engine may invoke the same generated code to periodically evaluation all rule conditions.

In one embodiment, a periodic evaluation and triggering of rules is provided by only updating the input attributes to their current values at the start of each period. These updates cause the rule conditions that are dependent on input attributes that are changed as a result of updating to be (re-)evaluated on the current inputs. Thus, rather than reactive to each input attribute change, the same rule engine may be executed periodically and still operate correctly. In fact, the same generated code may be invoked to be reactive or to be invoked periodically, depending on how the input processing is configured. That is, the input processing may be configured to update input attributes as the input is received or only at a poll period interval. Note that the above processing assumes that in this application, not triggering an action in response to an intermediate change to an input between these periods is not a problem when the triggering condition is not true at the start of the next period. That is, the application allows skipping an action when its condition is only transiently true between periods of execution. In one embodiment, this may be done by freezing all inputs for a period of time and updating at a discrete time period later.

In an alternative implementation, the compiler generates a procedure PP that, when invoked, invokes each of the reactive procedures with each of the possible parameters. In this embodiment, this PP procedure is invoked at the start of each period.

In one embodiment, the implementation of the procedure is optimized to minimize or avoid duplicate rule evaluation. For example, considering the previous example of the rule condition associated with a broken link, the procedure may recognize that the evaluation of the rule condition with the pair of interface (intfj,intfi) is the same as evaluating the rule condition with the pair of interface (intfi,intfj) so only one of these is executed as part of this procedure execution. This embodiment may generate a single optimized pollEvaluate procedure that implements all the rule conditions when invoked, outputting an indication of the rule conditions that are true.

Overall, the same code generation techniques may be used to generate rule engine code for a periodic polling form of execution as well as for the reactive execution described earlier, and in one embodiment dynamically switch. One of ordinary skill in the art of software programming may recognize that a variety of optimizations may be implemented beyond the ones detailed here, allowing efficient execution in the case of polling form of execution.

Control System as Collection of Rules. The control system (202) in FIG. 3 is logically implemented as a collection of rules for controlling the system where a rule is structured as the conventional condition-action approach. A rule execution engine (306) accepts inputs that allows it to evaluate the rule conditions (304). It then either periodically or in response to input changes (or both) performs the action (302) associated with one or more of the rule conditions that evaluates to true, as illustrated in FIG. 3, the action being to set control variables (210) to appropriate values. The effect of repeated evaluation and execution of the rule actions is effective control of the system (202) according to a corresponding objective function.

In one embodiment, the rule conditions (304) are evaluated at a regular period, such as every 100 milliseconds. In one embodiment, the rule conditions are re-evaluated whenever an input changes. In one embodiment, the rule conditions are re-evaluated on a regular period but also when particular inputs changes by a significant amount, such as more than a configured threshold.

In one embodiment, the rule condition evaluation is implemented by a matching mechanism where the rule conditions (304) are mapped onto symptoms and the root causes correspond to the different actions to take. Therefore, the rule condition evaluation may be performed in a predictable period of time. In an alternative reactive realization, the rule conditions may be automatically generated as conventional imperative "if . . . else" blocks, as described herein. In either case, the matching mechanism may determine the action to perform in a few milliseconds or less, which is adequate for the control of physical systems, because they generally react much more slowly.

In one embodiment, the rules are automatically generated by a program that iterates over input value combinations (304) and, for each potential input variable value combination IC, selects the action A' (302) that is expected to achieve a good result with respect to the system objective function, and then outputting a rule with a condition corresponding to this input value combination and action being this action A'.

In one embodiment, the selection of the action A' is performed by predicting, for each credible action A with input conditions IC, the new state S' of the system at time T2, assuming it is in a state corresponding to IC at time T1 and it takes action A. After each such prediction, it evaluates the objective function on this new state S' and records the result. After recording the objective function value for each such new state S' for all actions A, it selects the action A' that achieves the best objective function value. In one embodiment, one or two iteration loops may be described in pseudocode as:

```
for i in all input value combinations {
   for j in all possible actions {
   evaluate objective_function (simulation(i,j));
      record(action,objectiveScore);
   }
   outputRule(inputCondition,getBestAction( ));
   // select action with best objective_function value
   // and output rule
}
```

For example, if an autonomous airplane is in a state of being slightly below the target altitude, possible actions include modifying flaps, ailerons and throttle settings. Reducing the throttle is likely to have negative effect on the objective as is putting the nose down using the flaps, as determined by predicting with these choices of actions. Just raising the nose of the aircraft might be effective as long as doing so does not put the plane at risk of stalling. This behavior is detected by predicting the behavior of the aircraft with current airspeed range and this choice of action. This action would be assigned a low ranking by the objective function if the action would produce a stall. An action may include both increasing the throttle and adjusting the flaps. Each generated rule is thus structured as a condition that is true for the given input value combination and the action that has been determined to be the best relative to the objective function for that input value combination.

The above prediction is feasible with an engineered system (206) because such system must be designed to have predictable behavior, given a known set of inputs. For example, an airplane with a given throttle setting, attitude, passenger/cargo weight, airspeed, and so on has a reasonably predictable behavior in response to reducing the throttle. This prediction is generally realized by using a predictive model that is defined as part of the design of the system. A system without a prediction model has unpredictable behavior, which is unacceptable in many applications. Many engineered systems (206) have a reasonably accurate computer simulation of their behavior developed as part of the design process that provides this prediction. This simulation ensures that the behavior of the system, when actually realized, is going to meet the application requirements, so not just predictable behavior but acceptable predictable behavior.

In one embodiment, this prediction is performed by simulating the behavior of the system (206) forward in time assuming a current/starting scenario being that corresponding to the input conditions IC and the action A being taken. This simulation is typically realized by a time-stepped simulation program that steps the state of the system forward in time based on the inputs and the above model of the system. There is not necessarily a closed-form mathematical model of the system behavior. This simulation software may reasonably be many thousands of lines of computer code and may have an available API.

The objective function is also computable in an engineered system (206) because there needs to be quantifiable measures of performance that the system satisfies, such as the simple case of a refrigerated area remaining within a temperature range. As referred to herein computable means it is feasible to write a software procedure that returns some numeric measure of performance quality. In some cases there is not necessarily a closed-form mathematically function for this objective function. The software-implemented objective function implementation may reasonably be several thousand lines of complex computer source code that does a case analysis of the inputs and may have an API available for third-party use.

The cost of auto-generating the rule set is significant but is offline and incurred before the execution of the control system (202), so does not affect the performance of the control system (202).

One key aspect to automatic generation (or autogeneration) of control decision logic is specifying the target of the autogeneration as rules that are structured as condition (304)/action (302) and a rule execution means (306) that provides repeated/iterative evaluation of the rules and execution of the associated action for matching rules. Using this structure, the autogeneration does not have to deal with arbitrary complex control flow and algorithms. Instead, it simply determines the action (302) to perform under each of the possible input conditions (304) based on the predictive capability of the system under control (206) and the objective function. This rule structure may be compiled into conventional code from there, as mentioned earlier, or executed as rule by a rule engine. This relies on the property of a dynamic control system that proper execution entails repeatedly responding to changing inputs and adjusting the control variables to meet the desired behavior as captured by the objective function.

Optimizing Autogeneration. There are at least three aspects that make the techniques described herein more practical. Autogeneration may seem infeasible: With K inputs that each take on N values and select among A different possible actions which require T timesteps to evaluate, the total number of evaluations to generate the ruleset is N to power K times A times T, that is $N^KAT$, assuming different actions may be selected at each timestep. For any realistic values of these parameters, the total may appear impractically large.

The aspects that make this more practical are:
discretization of inputs;
pipeline partitioning control into separate control stages, with decision logic per stage; and/or
pruning of input value combinations.

Discretization of Inputs and Outputs. In one embodiment, the values from an input source are discretized into a small/finite set of ranges. For example, rather than providing the actual distance in meters to the vehicle in front as input to an autonomous vehicle (AV) control system, the distance may be provided in one of 5 discrete ranges such as: far (1), near (2), very near (3), close (4), too close (5).

Discretization of inputs means that the set of input value combinations is reduced to set of combinations of ranges. For example, with the distance example, the raw distance may have any one of several billion values when provided in meters, yet the discretization into ranges reduces the cardinality of input values to 5 in the above example, namely one of 5 values identifying the range corresponding to the distance to the vehicle in front.

Discretization means that the rules are effectively implementing a step-function approximation to a continuous function. In the autonomous vehicle (AV) example, for instance, there is a continuous formula in terms of a continuous value for distance to the vehicle in front that determines the degree of braking to apply. The discrete ranges for the distance mean that this function is being approximated using the steps defined by the set of ranges. The more ranges in the set, the better the approximation, but also, the greater the cost of autogeneration because that increases the number of input conditions to consider.

Discretization may also be applied to output/actions that might otherwise be considered continuous. For example, braking pressure is logically a continuous value. However, it may be discretized into ranges, for example: no braking, slight braking, medium braking, hard braking, and very hard braking. Again, the approach is to approximate the continuous function with these discrete ranges, thereby dramatically reducing the number of actions that the autogeneration program considers, and thus reducing the cost of autogeneration.

With discrete actions, the approximation is further aided by rapid re-evaluation of rule conditions (304) during control system execution and the fact that physical actuators such as brakes, flags, throttles, and so on react relatively slowly compared to computer computation times. For example, if the right degree of braking is actually between medium braking and hard braking, the output of the control system (202) may oscillate between these two ranges. However, if the reaction time RT of the braking system is longer than the periodic rule evaluation, if the previous action was medium braking, the output action is likely to change from medium braking to hard braking just as the actual brake pressure has actuated to be somewhat below the midpoint between medium and hard. Therefore, the actual physical effect is this intermediate level of braking. Also, note that if the system applies just medium braking in this example, the situation may quickly evolve to needing hard braking to compensate for the under-braking.

In one embodiment, each action (302) is just the setting of one or more output control variables (210) that indicate the control levels of various actuators, PID controllers for said actuators, or similar. For example, with an AV, the control variables may be the angle of the steering wheel and the level of the throttle and/or braking for negative values. In one embodiment, repeatedly selecting the same action (302), for example a negative 15 degree angle of the steering wheel, has no effect other than maintaining the same control setting. In general, an action (302) may be made idempotent so that selecting the same action repeatedly each timestep on rule evaluation maintains the same behavior when appropriate. For example, if the input conditions (304) indicate to accelerate to a given velocity and the throttle setting is providing adequate acceleration to achieve this, the throttle should not be increased on each timestep that the vehicle is under the target velocity. Instead, the action (302) is the setting of the throttle control variable (210) to achieve a desired acceleration and thus does not change unless the current setting is not achieving the desired acceleration to reach the target velocity. Alternately, the action (302) may use existing or new PID controller setpoints as control variables (202) to, for example, provide a dedicated method of achieving a target velocity in a desired acceleration curve.

In some applications, location is also relevant to control. For example, in a flight control system, the location and pose of the aircraft is important. In particular, the exact position of the aircraft may be given in continuous values corresponding to altitude, longitude and latitude. However, altitude may be discretized into a set of ranges for input to the control system, reducing the number of values to consider, as for other inputs described herein. Moreover, it is often possible to provide a discretized input that is relative to some objective location. For example, the control system is normally concerned with causing the aircraft to follow a specified flight path, that is, a "lane". Therefore, it is adequate for the control system to know the difference between where the flight plan indicates the aircraft should be located and where it actually is located. The difference is generally much smaller than the absolute values involved. Therefore, a smaller number of ranges in the rangeset may be used and still achieve effective control. The smaller cardinality to the rangeset means the autogeneration is lower cost than trying to use absolute values.

Lane Structure to Simplify/Discretize a Dynamic Environment. As referred to herein, a lane is a discretized directional path segment that the controlled system (206) may transit through under certain conditions through an N-dimensional space while complying with non-dynamic constraints. One example of a lane is a lane in a road, but as described below there are other environments where the abstraction of a lane works including a stock market environment as described below and a medical application environment as described below. Thus, lanes may impose structure on a dynamic environment such that a rule-based system may effectively automatically navigate a controlled system through the environment. Throughout this specification, the examples of a self-driving vehicle, stock trading, and/or medical domain/applications may be given for illustrative purposes, but the principles, techniques, and systems described herein may be generalized to other applications without limitation.

As described herein, a rule-based system is an intuitively appealing approach for structuring an automated control system because normal manual approach to control is often specified in terms of rules. For example, within the application domain of self-driving cars, manual driving is governed by rules including the rules of the road and the rules of safe driving. Similarly, in an automatic stock trading system, there are rules associated with trading, both imposed by the market platform itself as well as the financial institution running the trading applications. Similarly, medical treatments for diseases or disorders generally follow a prescribed set of rules, for example, a patient should not be prescribed to take medicine X if already taking medicine Y.

When applying a rule-based system ("RBS") to automation control, a first issue to address is that the rules for manual/human operation are often stated in terms of constraints, rather than the condition:action formulation used in an automated RBS. For example, a standard driving rule is: Do not exceed the speed limit. This rule does not indicate the speed at which the vehicle should be traveling, but leaves it to the judgment of the human driver. This example is a constraint in the sense that it states that the speed of the vehicle is always less than or equal to the speed limit. A constraint is referred to herein as a statement and/or condition that the system should work to make true. With an automated system, rules need to provide this judgment. That is, there needs to be rules in a condition:action format that cause the system to respond to conditions of rules becoming true to trigger actions that achieve this constraint.

In a simple formulation, a basic rule may easily be formulated as:
    if(speed>speedLimit) {
    slowdown( );
    }
However, in reality, the conditions for slowing down are much more complex, including the potential presence of a dynamic obstacle that suddenly appears in the direction the vehicle is headed, a traffic light ahead, entering a relative sharp turn, and so on. The realistic condition for when a vehicle should slow down may be quite complex and hard to get right.

A similar complication occurs in a stock trading application. An initial rule may be: Do not allow the portfolio to have more than X percent of its value in a single stock. However, the condition:action rules to accomplish this may be more complex. In particular, a rule for increasing a stock position or selecting the amount to buy may need to avoid having the amount exceed this X percent of the value of the portfolio. However, if the value of one stock goes up significantly or the value of the rest of the portfolio falls significantly, it is possible that this X percent threshold is again exceeded and needs corrective action. The exact action may be dependent on various factors, including which of these scenarios is causing this constraint to be of concern. As a note of clarification, the term "vehicle" is used in an investment context to denote a particular investment category as an "investment vehicle".

Another challenge is actions in dynamic environments/applications are not instantaneous acts, but may require taking place over a period of time during which conditions may change. For example, in a medical application, triggering the action to start having the patient take a particular medicine does not immediately produce results. Moreover, even after initiating this treatment, the condition of the patient could suddenly change, calling for a different treatment plan. As referred to herein, "suddenly" means relative to the time required for the selected treatment to have effect. Thus, the rule set may be further complicated by needing to take into account actions that have initiated some behavior but have not completed.

Another challenge for RBS is these applications may have an unbounded number of actions to be taken and thus an unbounded number of conditions to evaluate to select these actions, and/or these conditions may be changing rapidly and unpredictably. For example, a self-driving vehicle operating in an environment in which there are many other independently controlled vehicles has to implement the constraint of not colliding with these other vehicles even though it may not predict the behavior of these other vehicles. Similarly, in an automated stock trading system, the prices of the stocks themselves may vary significantly outside of the control of the control system.

A control system may implement actions that respond to these dynamic changes to try to maintain the constraints that are specified for the control system. One challenge is specifying the logic for this control that is correct, efficient, and reliable, when there may be an unbounded number of dynamic scenarios that may arise and thus an unbounded number of cases to consider in the control logic. This challenge is further complicated by the fact that actions in many cases may not be performed instantaneously, so the environment may change further during the execution of an action.

There is often a basis for a top-level plan based on the knowledge of the environment, referred to as "route guidance" herein and in a navigational context. For example, an autonomous vehicle ("AV") may use conventional vehicle navigator technology based for example on GPS ("global positioning system") to generate a plan that follows a reasonable sequence of roads and intersections to the destination. In a financial environment, an automated trading platform may navigate a portfolio through a stock market. The stock market is itself a dynamically changing collection of stocks, over time. In a medical environment, a medical treatment plan may navigate a patient back to health.

In essence, the route guidance module produces a sequence of waypoints that correspond to key roads and actions at intersections. Similarly, there may be a top-level plan for automatic stock trading, based on P/E ratio, different indexes, trading strategies, and so on, with the waypoints being the open of trading in the morning to the close of trading at the end of the day, at least in a day trading application.

However, this type of top-level plan does not necessarily take into account the specific dynamic aspects of the environment that may occur between the waypoints. For example, an AV entering to an intersection where it is to turn left needs to switch to the left turn lane before the intersection and then negotiate the turn while complying with the constraint that the vehicle must avoid colliding with other vehicles and obstacles even though it may not accurately predict what other vehicles and dynamic obstacles may do while it is executing this plan. Similarly, there may be stock market changes, such as change in interest rate, that may not be predicted and may call for a rapid reaction plus constraints such as not becoming overweighted in a particular industrial sector. As referred to herein, this form of navigation is a "dynamic navigation" because it takes into account dynamic elements in the environment.

A technique for reacting quickly to the dynamically changing environment without incurring the overhead of generating short-term plans or courses of action is described herein. Embodiments implementing the technique include self-navigating vehicles, an automatic stock trading platform, medical treatment or other applications that exercise control or recognition in a dynamic environment. As referred to herein the term "automated dynamic navigation" is defined as the process of determining and maintaining a course or trajectory to a goal location. This trajectory may occur in a generalized N-dimensional space and the "determining" step includes navigating a path through this space that is consistent with the constraints imposed on the controlled system.

A control system (202) implementing automatic dynamic navigation for a controlled system or "vehicle" (206) through a dynamic "lane"-structured environment using a rule-based system where the triggered action is to dynamically select and execute a "lane maneuver" to achieve this navigation is described herein. That is, navigation is achieved by executing new lane maneuvers and discontinuing existing lane maneuvers in response to rule triggering, where the rule conditions are responsive to changes in the environment and the vehicle.

As referred to herein, a "lane maneuver" is an action performed over time that controls the vehicle relative to lanes. For example, a simple maneuver is maintaining the vehicle's speed in the center of the current lane. In one embodiment, a maneuver is an action that is performed independent of dynamic changes to the environment during the time of the action. For example, a lane change to the right adjacent lane is a maneuver for an AV.

Lanes. A lane is a discretized directional path segment that the controlled vehicle may transit under certain conditions through the N-dimensional space in which it is contained from the lane start to its end while complying with non-dynamic constraints. For example, a physical road in the self-driving car application is discretized or divided into physical lanes or path segments that are each wide enough and smooth enough for the vehicle to transit. For example, on a two-lane road in the US, the vehicle is expected to stay in the right-hand lane except when passing. Without limitations and as detailed below, lanes are an abstract concept that may be applied to physical lanes in the AV application but may also be applied to other dynamic environments like stock trading and medical applications.

Lanes impose structure on the environment or space to be navigated. That is, rather being able to drive anywhere, the vehicle is constrained to drive in one lane or switch to another and then drive in that lane. For example, on a six-lane divided highway, the vehicle either drives in the rightmost lane, the middle lane or the leftmost lane, except when it is changing lanes. Thus, the lane concept reduces the choices for action in the short-term. For example, a vehicle may either proceed in the current lane or else switch to another. As a side note, it may be possible to specify a lane-structured environment in which it is impossible for a vehicle to get from one destination to another but it is not useful to do so.

The lane structuring restricts the choices that a vehicle has to navigate. For example, in the self-driving car case, a vehicle may have to navigate with respect to lanes, for example follow the current lane, switch to an adjacent lane, or turn into a lane on another road at an intersection.

The restrictions of lanes may mean that some navigation plans that could otherwise be executed may not be considered or supported. For instance, if a road is completely blocked, it may be physically possible for the vehicle to go "off-road" and still get to the destination in an unconstrained navigation. However, with lane-structured navigation, unless a lane is provided around the blockage, the vehicle is forced to stop and may not make it to the destination without manual intervention.

Lane-structuring also may mean that the vehicle dynamic navigation may also assume that other vehicles use lane-structured navigation as well. For example, the vehicle control may assume that an approaching vehicle may remain in the lane it is in and not suddenly deviate into the current vehicle's lane. By making this assumption, lanes may allow some driving that would not otherwise be feasible. For example, consider the constraint: the vehicle should not have a closing velocity V with another vehicle at distance D that exceeds the vehicle's ability to slow down by V within the time to travel D. This constraint is restricted to just other vehicles in the same lane as the current vehicle. This restriction to lane-based behavior is precisely what allows a driver to assume it is safe to continue driving in the current lane when there is a vehicle approaching fast in an adjacent lane.

The lane restriction may be critical for safe navigation because it is physically impossible to handle many common scenarios without dependence on lanes and associated vehicle behavior. For example, an oncoming vehicle on a two-lane road is normally in its own lane traveling at say 65 miles per hour. It is physically impossible for a controlled vehicle to avoid a collision if this oncoming vehicle suddenly veers into its lane, given the high closing speed. If there were no lanes, a vehicle could not travel at any significant speed if oncoming vehicles could choose to navigate to anywhere on the road at any time. Similarly, the vehicle passing parked cars may not physically avoid a collision if a supposedly parked car suddenly pulls out into its lane.

In the case of on-road vehicle navigation using high-definition (HD) maps, the lane information is available to the vehicle a priori to driving in this area. The vehicle then needs to perform localization to maintain the location of this vehicle on the HD map. There are existing techniques to use GPS, dead reckoning and visual or other lane marking indications to achieve localization of the vehicle with high accuracy.

Figure 6:
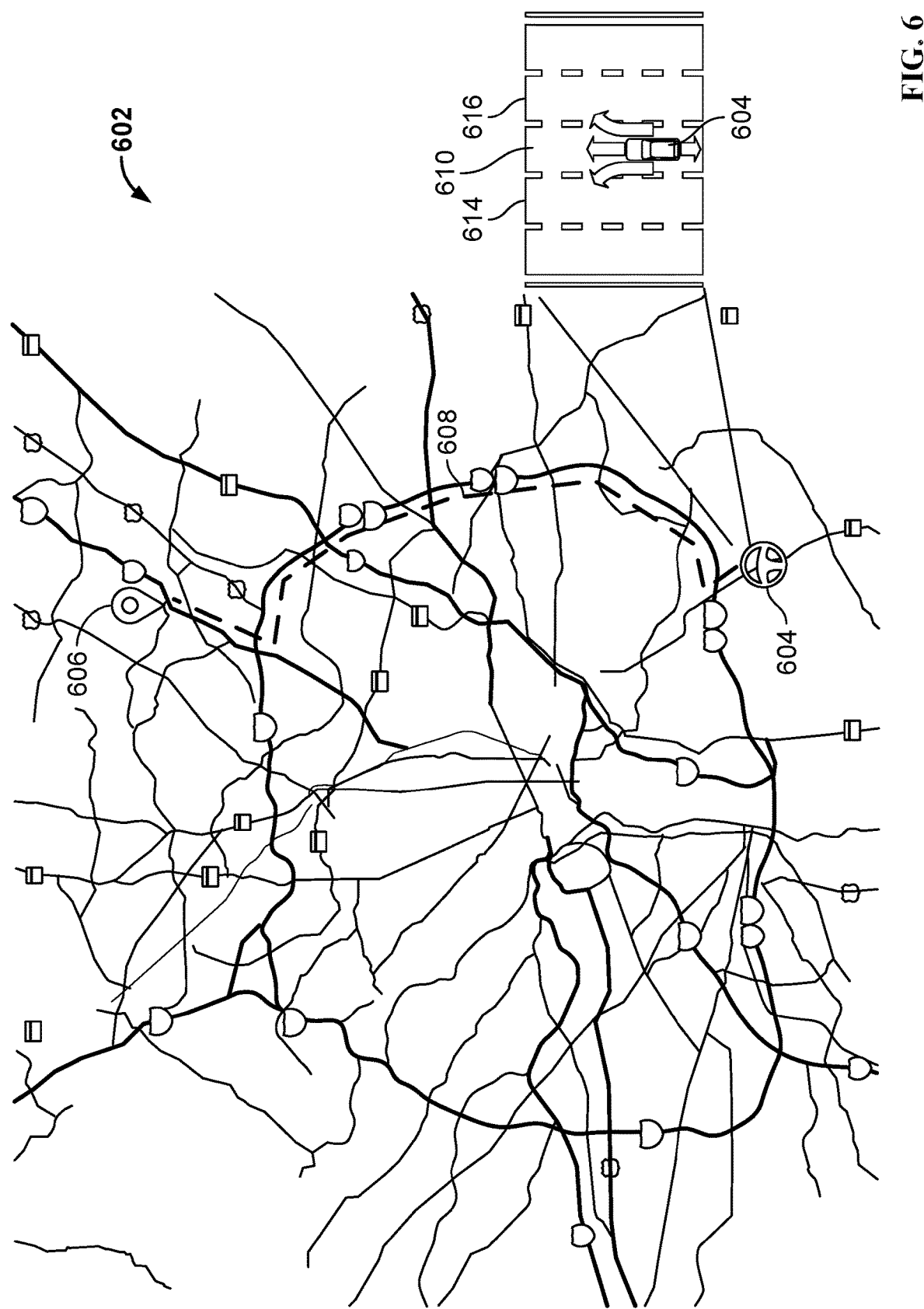
FIG. 6 is an illustration of lanes in an autonomous vehicle application example.

FIG. 6 is an illustration of lanes in an autonomous vehicle application example. Map (602) illustrates an AV (604) with a location goal (606). An example of a top-level plan (608) includes a series of waypoints as it navigates on and off various highways, roads, and transition roads like on-ramps and off-ramps. Along this plan, the AV (604) travels in a current lane (610) with two adjacent lanes (614), (616).

Lanes in Other Domains/Applications. In a stock trading domain, there are lanes based on classification of stocks into different industry segments. Commonly, other market participants do not suddenly switch all investments into another random set of stocks. Instead, certain dynamic events such as oil refinery explosions, interest rate changes, and other examples are known to impact particular "lanes" or industry segments. Therefore, a portfolio may react to dynamic events by recognizing that each event only impacts one or more lanes of investment, and the constraints associated with those lane(s). For instance, a major explosion at an oil refinery might negatively impact the company operating the refinery, but benefit other companies in the oil refinery "lane", and negatively impact other companies are highly dependent on oil, such as companies in the transportation "lane".

Unlike the self-navigating vehicle case, the automatic stock trading application may have hierarchical "lanes", a top hierarchy of consumer products, a mid-level hierarchy of the dry goods sector, and a lower-level hierarchy of particular stocks/companies. It may also have multiple investment themes that correspond to effectively controlling multiple vehicles/subvehicles at the same time, complying with constraints between these, such as avoiding being long in too many companies that are growth phase companies across every "lane" of an investment theme.

Figure 7B:
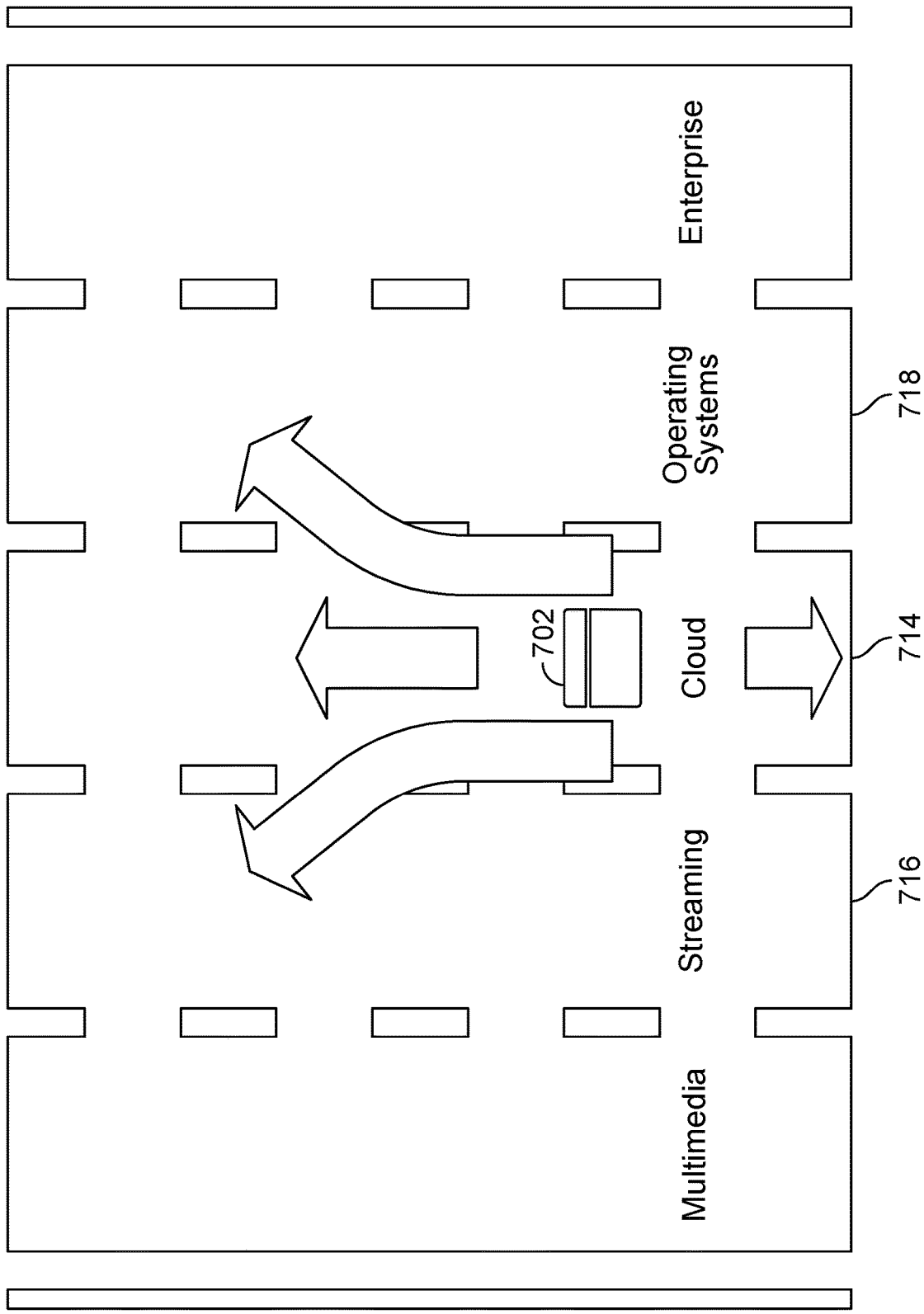
Figure 7C:
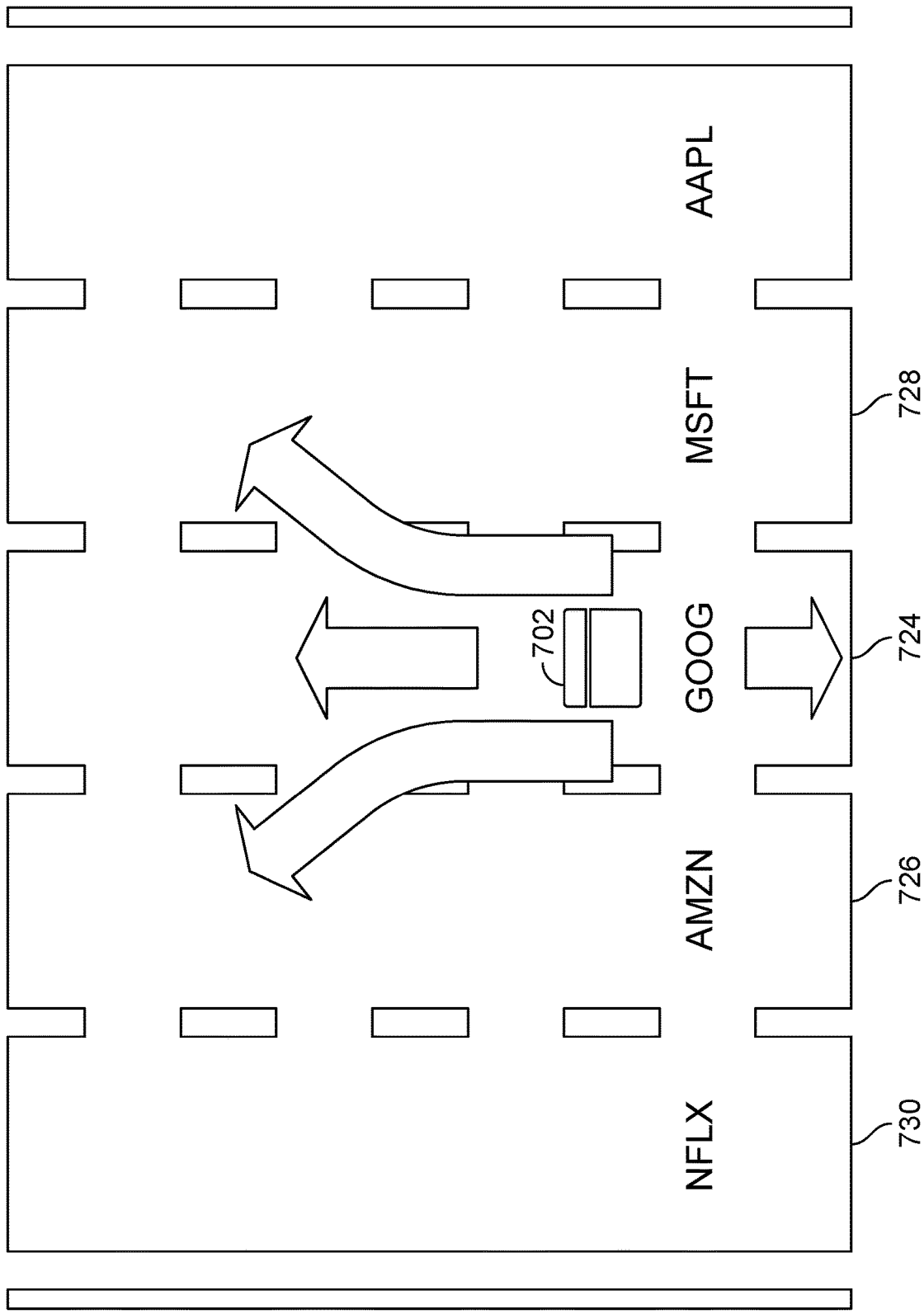

FIGS. 7A, 7B, and 7C illustrate an example of hierarchical lanes for stock trading. In FIG. 7A, the vehicle/app (702) is currently in a "technology services" top hierarchy lane (704), which is adjacent to the "electronic technology" top hierarchy lane (706) and the "health technology" top hierarchy lane (708). In other words, from lane (704), the vehicle/app may move to an adjacent lane such as lane (706)/(708). In FIG. 7B, the vehicle/app (702) is currently in a "cloud sector" mid-hierarchy lane (714) in the "technology services" top hierarchy lane. "Cloud sector" mid-hierarchy lane 714 is adjacent to the "streaming" mid-hierarchy lane (716) and the "operating systems" mid-hierarchy lane (718). In FIG. 7C, the vehicle/app (702) is currently in a "GOOG" lower-level hierarchy lane (724) in the "cloud sector" mid-hierarchy lane in the "technology services" top hierarchy lane. Lane (724) is adjacent to the "AMZN" lower-level hierarchy lane (726) and the "MSFT" lower-level hierarchy lane (728).

In this vein, stock trading may be viewed as navigating multiple investment vehicles/subvehicles at the same time with constraints between these vehicles, complying with these inter-vehicle constraints as well as constraints between the environment and each of the vehicles.

Figure 7D:
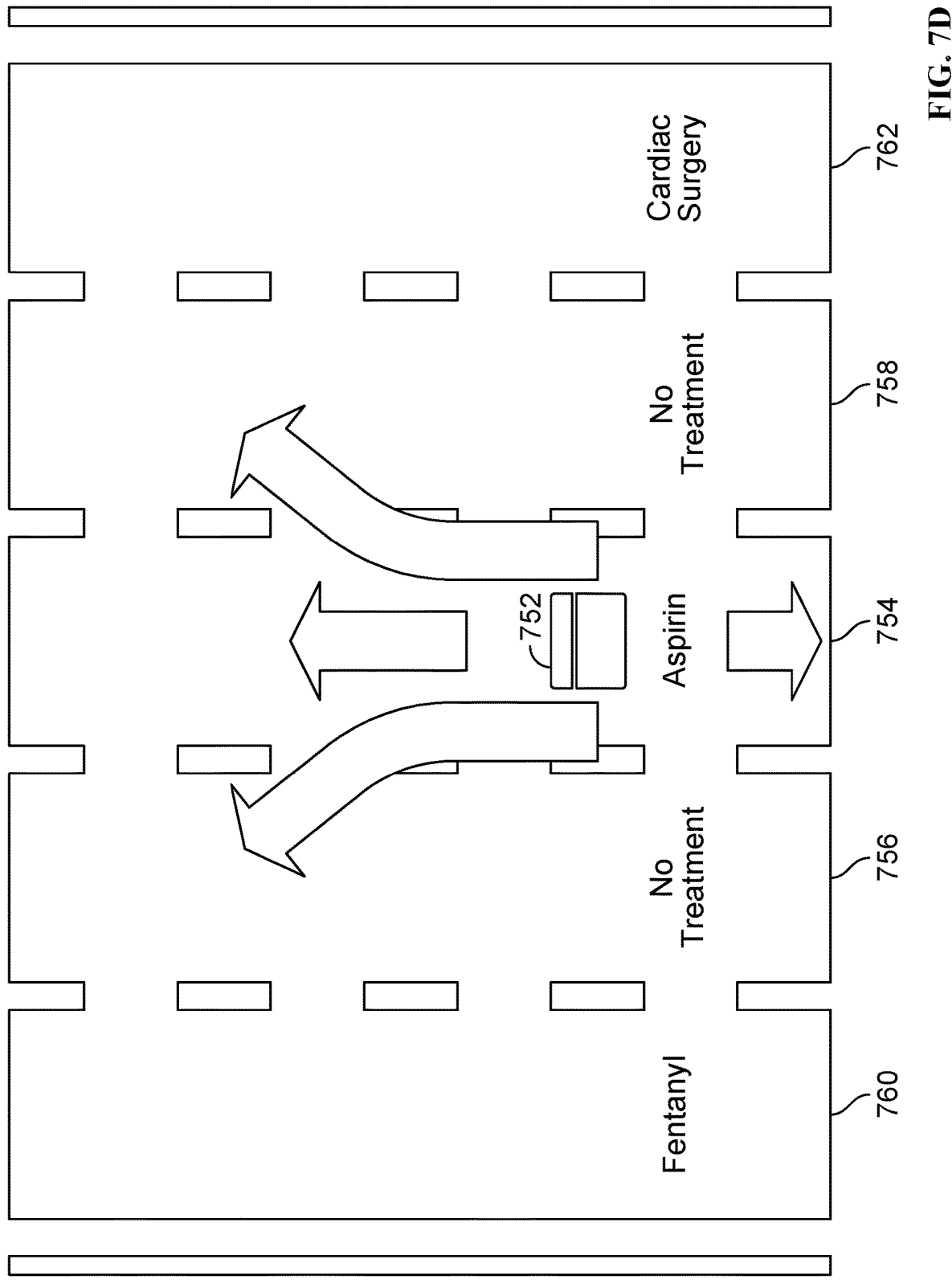
FIG. 7D illustrates an example of hierarchical lanes for a medical application.

FIG. 7D illustrates an example of hierarchical lanes for a medical application. The vehicle/app (752) is currently in an "aspirin treatment regime" lane (754), which is adjacent to two lanes of "no treatment regime" (756), (758), indicating the period it takes for a patient to stop an old treatment regime before starting a new one. One "no treatment regime" lane (756) is adjacent to a "fentanyl treatment regime" lane (760) indicating one possible new treatment, where the other "no treatment regime" lane (758) is adjacent to a "cardiac surgery treatment regime" lane (762). Without limitation, the illustrations of FIGS. 7A, 7B, 7C, and 7D are meant to draw parallels with the AV application of FIG. 6 by displaying lanes in two-dimensions, like a physical roadway. By conceiving in more than two dimensions, the same principles may be generalized to, for example, a three-dimensional set of lanes where the "no treatment regime" lanes (756), (758) are the same lane and other treatment regimes (754), (760), (762), etc. are all adjacent to the "no treatment regime". Without limitation, an N-dimensional space may be used for other applications.

Generic Lane View. In a most general formulation, a lane is generally a constrained directional path in the N-dimensional space that the "vehicle" is travelling that is adequate in the absence of dynamic obstacles for the vehicle to travel from one end to the other without violating vehicle constraints including static vehicle constraints. A lane may have certain dynamic and static characteristics and behaviors. For example, a lane corresponding to a particular patient treatment plan in a medical application may entail particular side-effects and may have a bounded time of application. Navigation entails following the current lane as well as switching to a different lane from time to time as appropriate to achieve the desired objective, such as to cure the patent. The vehicle, a patient in this medical application example, is not allowed to change to an arbitrary other lane from its current lane. Instead, it is only allowed to switch to adjacent lanes to the current lane.

The notion of "adjacency" is defined in application-specific terms and constraints. In particular, a lane L0 is adjacent to another lane L1 when it is feasible to execute a lane maneuver from L0 to L1 subject to some dynamic conditions. For example, referring to FIG. 7D, a patient being treated with Fentanyl, and thus in the lane (760), may not directly switch from this lane or treatment to an aspirin treatment lane (754) without going through the "no treatment" lane (756). This is required because there may be a bad interaction between drugs if the patient has some Fentanyl in their system when they start taking aspirin. Moreover, the patient is only allowed to switch from the Fentanyl lane if their symptoms have stabilized. The designation of adjacency between lanes is part of a lane-structured environment.

Lane Maneuvers. A "lane maneuver" is referred to herein as an action that takes place in terms of one or more lanes. For example, change-to-right-lane is a maneuver that changes the vehicle from the current lane to an adjacent lane on the right. Thus, as above, an "adjacent lane" is referred to herein as a lane that may be reachable from the current lane with a lane maneuver, similar to the physical two-dimensional lane in driving. In this sense, the lanes and their adjacencies serve to discretize the environment so the number of maneuvers is also conveniently finite and implementable. For example, a change of lanes to an adjacent lane is one of a small number of maneuvers and is straight-forward implement.

A maneuver may in many cases be a static, precomputed solution relative to the lanes. For example, a 'change lanes' maneuver is static where the lanes are a standard width—a simplified and standard motion plan may be used, perhaps parameterized by the speed of the vehicle. Moreover, a maneuver does not have to take into account dynamic events or obstacles. Therefore, an AV may take instantaneous action to perform a selected maneuver when a new maneuver is selected without having to generate the maneuver sequence or procedure dynamically.

Figure 8:
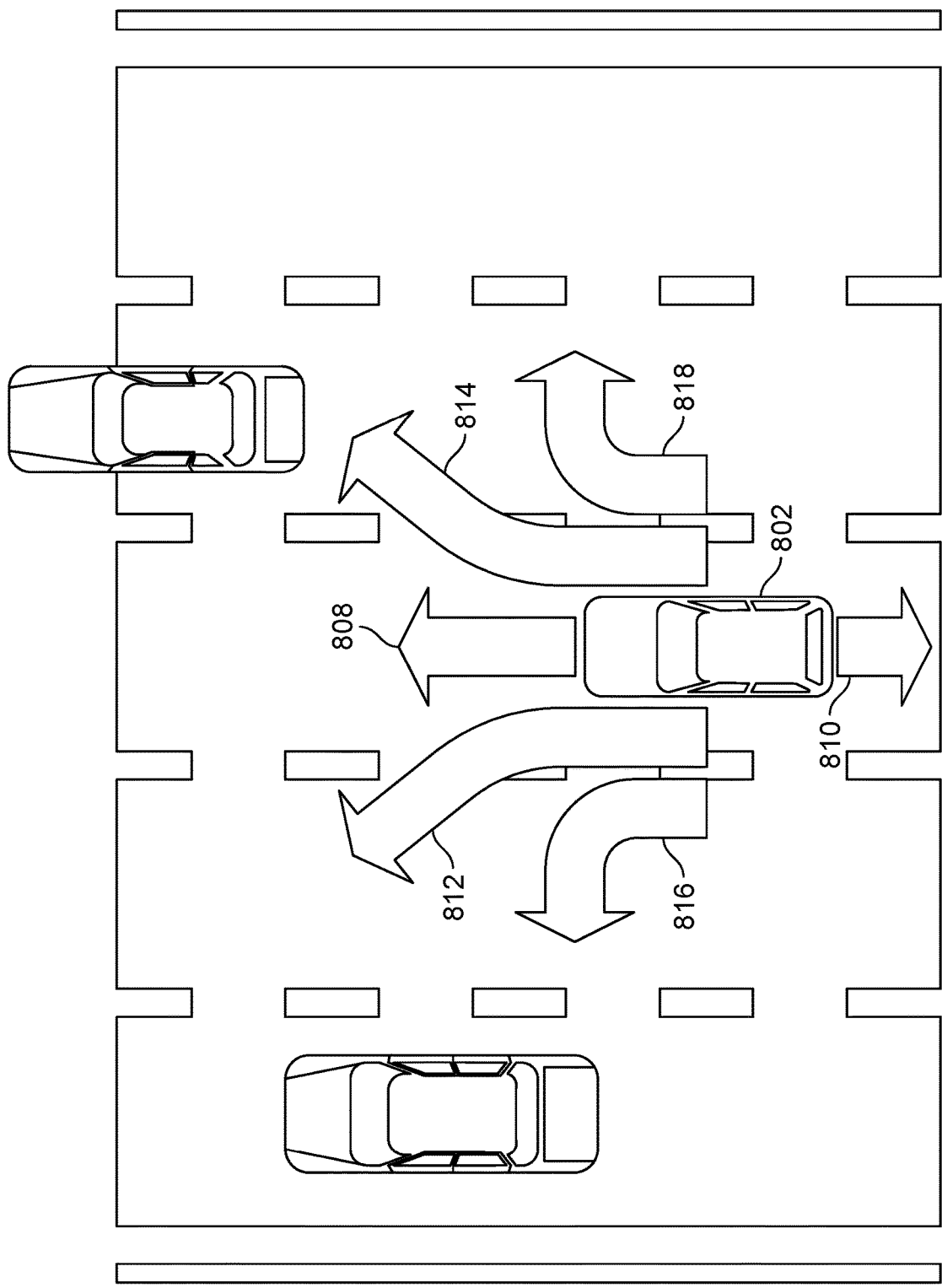
FIG. 8 is an illustration of lane maneuvers for an autonomous vehicle example.

FIG. 8 is an illustration of lane maneuvers for an autonomous vehicle example. In general, there is normally a bounded number of actions that the controlled system may perform, especially when actions are qualified by parameters. For example, a factory robot may reach forward, lift up, lift down, and so on. Similarly, as shown in FIG. 8 a vehicle (802) may slow down (810), speed up (808), change lanes to the left (812), change lanes to the right (814), perform a left turn (816), perform a right turn (818), and so on. These actions are a bounded set of actions, possibly parameterized by the speed, road conditions, and so forth. So, the maneuvers may be preset in the controlling software and/or implemented in hardware (e.g., hard-wired), and thus performed with quick response.

The lane structuring may be used to dramatically reduce the number of actions to consider at any given time. For instance, consider a flat plain that stretches from point A to point B. Without any lanes, there are an unbounded number of potential paths to take between A and B. With one lane in each direction between point A and B, the actions are reduced to staying in the driving lane (slowing down, speeding up or maintaining speed), changing to the other lane to pass, and changing back to the driving lane after passing.

In a medical context, there are a bounded number of lane maneuvers because there are established sequences in treatment that are known to safe. For example, the doctor should never prescribe a sudden change in treatment plan to one that is not known to be a safe change to make. In a stock trading domain, there are a bounded number of actions or maneuvers to perform, such as sell at market, stop-loss, and so on. Moreover, a stock portfolio that is required to have 10 percent of its assets in high-tech large cap growth may not replace one such stock in the portfolio with an arbitrary other stock. Instead, referring to, for example FIG. 7C, if the portfolio has a large holding in AMZN (726), it can only replace this stock with GOOG (724) or NFLX (730) because these stocks are adjacent to AMZN (726). As mentioned earlier, this example of adjacency is illustrated in two dimensions. In reality, there may be many different stocks that are adjacent to AMZN, which may be easily handled in an N-dimension space.

It is not strictly necessary for the maneuvers to allow a vehicle or a robot to navigate in every possible scenario in which navigation is strictly possible; human drivers may not either. For example, consider a zig-zagged collection of static obstacles and dynamic objects moving in some rapid pattern through an intersection or similar. It may be theoretically possible to safely navigate through this intersection but few humans would be able to navigate this situation. The situation is highly unusual so the inability to handle automatically would be acceptable, given the economic value of being able to safely drive in the actual real world scenarios of interest.

Thus, there are a set of basic lane maneuvers, for example in the AV context: maintaining speed in current lane, slowing down, speeding up, changing to right lane, changing to left lane, right turn, left turn, and so on. These maneuvers may be refined to more specific maneuvers. For example, slowing down may be refined to: emergency braking, hard braking, gradually braking and deceleration/cutting the throttle. The lane structure implies a relatively small set of base maneuvers that may be refined to a larger more sophisticated set.

By contrast, without the lane structure, there are an unbounded number of possible actions. Moreover, the number of conditions is at least the number of actions, so the number of rule conditions is also excessive unless the number of actions/maneuvers is severely restricted. In particular, without lanes, either an unbounded number of actions results such as "move right by 1 inch", "move right by 2 feet", "move right by 3 yards", and so forth, or else the action is parameterized without limit or without a meaningful limit. For example, if the action is to move right by X feet, a very large value may have a different realization than a small value, so is hard to implement per se. By contrast, with lanes, changing lane to right is used for a small movement, but to go a significant distance to the right, the vehicle turns to the right and then follows the lane going right and then may turn left to continue forward.

In one embodiment, lane maneuvers are implemented to be "preemptable" as referred to herein as when a new maneuver may be triggered immediately even though another maneuver is being executed. The new maneuver is able to take over and execute its maneuver, taking into account the intermediate state of the vehicle based on the previous maneuver. For example, the maneuver of changing to a passing lane and accelerating may be triggered previously but before this action is completed, a dynamic obstacle is detected that triggers the maneuver to slow down and return to the driving lane. This maneuver recognizes the current position of the vehicle with respect to the driving lane and adjusts its steering actions based on the offset of the vehicle relative to the driving lane. In particular, if the vehicle has only slightly departed from the driving lane at the point that this new maneuver is triggered, the steering action may need to be less aggressive than if the vehicle is already fully in the passing lane.

Lane Subconditions. A "lane subcondition" is referred to herein as an input that indicates the state of one or more of the lanes relative to this vehicle or other objects. For example, hasRightLaneClear is a subcondition that is true if the right lane relative to this vehicle is clear of obstacles. It is a lane subcondition as it is tied to the state of a lane.

Just as the lane structure reduces the number of lane maneuvers, it also reduces the number of lane subconditions that are required. This is because the only actions are relative to lanes as lane maneuvers, so it is acceptable to only consider subconditions relative to the lanes. That is, if the only choice of actions is one of the lane maneuvers, the condition for selection of a lane maneuver should be adequate if expressed in terms of lane subconditions. With lanes, the conditions of interest are reduced down to those that should trigger each of these actions. For instance, the action of slowing down in the current driving lane has a small number of subconditions tied to the state of the current driving lane and possibly the adjacent lanes as well as the current position of vehicle in the current lane.

Lane subconditions are often easier to determine from the sensors on the vehicle because most or all of the relevant subconditions are associated with the current lane or adjacent lanes and relative to the vehicle. For example, hasRightLaneClear subcondition is relative to the vehicle and may be sensed by sensors on the vehicle including cameras, microwave, radar, and lidar, on the right-hand side of the vehicle. A lane subcondition is also local to a controlled vehicle, making it easier to sense accurately.

The lane structure also allows the exclusion of subconditions that may cause false positive reactions. For example, without lanes, a vehicle may want to sense whenever there is an object that has a high closing speed to this vehicle. With lanes, on a two-lane highway that curves slightly, an oncoming vehicle in the opposite lane may appear to have such a high closing speed: With the lane structure, the vehicle may recognize there is an on-coming vehicle in the opposite lane and only use this subcondition to preclude passing in the opposite lane and not otherwise react to it.

It is possible to hypothesize a scenario in which lane subconditions are not adequate. For example, a rock may drop off a tall cliff adjacent to the road, dropping directly onto the vehicle. With additional subconditions that are driven off of aerial sensors, it may be possible to avoid this collision. However, these are extreme and unusual circumstances that are beyond what human/manual drivers could typically handle. Nevertheless, it may be feasible to extend sensors on the vehicle to detect subconditions that are relevant above the lanes and thus treat these as additional lane subconditions, as required in this extreme example.

With lane structuring of the environment, RBS navigation is realized by having rule conditions, as lane subconditions, triggering the rule actions, as lane maneuvers. For example, in the application of a self-driving car, one subcondition may be that the current lane is blocked ahead. Another two subconditions may be the adjacent left lane and the adjacent right lane are free. A final subcondition may be that a right hand turn is coming up. With this set of subconditions, it is reasonable for the vehicle to select the maneuver of switching to the right lane, rather than braking or switching to the left lane. That is, the rule for the above may be implemented as:

if(laneIsBlocked and rightTurnImminent and rightLaneClear) {
  changeToRightLane( );
}

Note that the subcondition of the leftLaneClear is not required for this rule and so is not included in the lane subcondition.

In general, the lane-structured environment results in a relatively bounded set of maneuvers and a relatively bounded set of subconditions to consider, so the rule set is of reasonable size to design, verify and execute.

General Effectiveness of Discretization. Increasing the number of ranges in the discretization improves the approximation to these continuous values at the cost of increasing the cost of auto-generation and the cost of matching, the latter because of the number of rules involved, and vice versa. However, because of the smoothing effect of physical actuators together with the effect of rapid re-evaluating of rule conditions, rapid relative to physical reactions, a relatively small number of discrete ranges are sufficient. This sufficiency is also enabled by the monotonicity of the actuators. That is, more brake pressure leads to stronger braking/deceleration.

As described here, the design engineer for control system (202) has tasks including:
 specifying the discrete rangesets for inputs and the discrete actions for outputs and making a proper trade-off between the accuracy of the control and the cost of automatic generation;
 providing a predictive simulation model/implementation of the engineered system (206); and/or providing an implementation of the objective function of the engineered system (206).

With these, the design engineer may then automatically generate the rule set that provides decision logic for the system which then may be compiled into executable code, or executed by a rules engine.

In one embodiment, a program running on a computer (100 of FIG. 1) accepts as input a specification of inputs as range sets, a simulator module, and an objective function, and then generates the control decision logic rules automatically.

Figure 9:
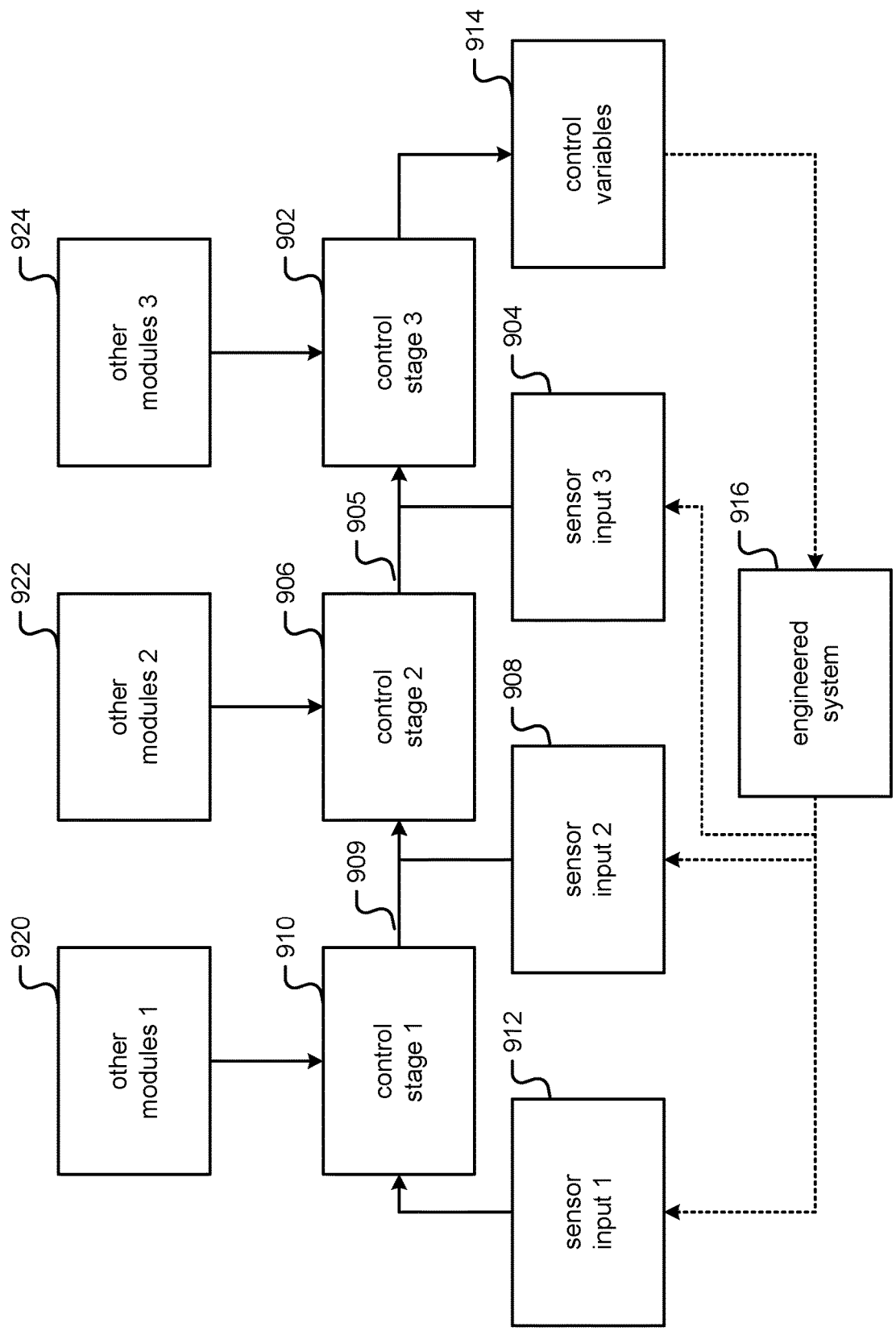
FIG. 9 is a block diagram illustrating an embodiment of pipeline partitioning of a control system.

Pipeline Partitioning. FIG. 9 is a block diagram illustrating an embodiment of pipeline partitioning of a control system. As shown in FIG. 9, control is divided into three separate pipeline stages. In this embodiment, control is divided into pipeline stages, each with its own objective function and its own table or generated code. In this embodiment, the stages are structured in terms of the length of timeframe that a stage considers. With three stages, for instance, a first stage may handle a long timeframe for control, a second stage may handle a shorter timeframe, and a third stage may handle the shortest timeframe.

For example, with an engineered system such as an airplane (916), as shown in FIG. 9 the third stage (902) may be concerned with a short-term control aspect of achieving a specified altitude, attitude and orientation. In this case, it is only concerned with the flight characteristics of the airplane (904) as sensor inputs and the aspects of the environment, such as altitude, wind speed, and so on. A second stage (906) may be responsible for tactical control such as avoiding obstacles and weather disturbances, with appropriate sensor inputs for weather and obstacles (908). The actions that it selects take place over a longer period of time. Then, the first stage (910) is concerned with strategy for following a given route over a longer period time, with appropriate sensor inputs for maps and positioning (912). Its actions take place over an even longer period of time.

This ordering is imposed because earlier stages like (910) are higher-level and primarily provide objectives or suggestions for a subsequent stage like (906) to try to achieve, if feasible. For example, the aircraft may have a strategy generating the first stage (910) to bank left to align with a landing strip yet the second stage (906) may detect that this action would put it on collision course with another aircraft. Therefore, the second stage (906) would (temporarily) override the suggested action by the first stage (910). In other cases, a later stage like (902) is refining the action selected by the previous stage like (906). For example, a second stage (906) might indicate to bank left while the subsequent stage (902) refines this into specific adjustments (914) to the ailerons, throttle and rudder and/or PID controllers with setpoints to these mechanisms.

As such, partitioning into stages may be regarded as a functional partitioning in the sense that a first stage (902) is deciding on strategy, a second stage (906) is deciding on tactics and the third stage (910) is controlling actual execution. It may simply be the case that these different functional components require considering different timeframes.

Note that sometimes it is not feasible to partition by actuators or by sensors. The system being controlled needs to operate correctly based on a unified control mechanism. For example, controlling a flying drone when landing requires coordinated control across all the actuators and input from all its sensors.

This partitioning into stages by length of timeframe may significantly reduce the overall complexity of auto-generation in several ways.

First, it means that some inputs are not needed by some of the stages, thereby reducing the cardinality of input conditions that autogeneration for this stage has to handle. For example, the last stage (902) in controlling an aircraft is only concerned with flying the aircraft according to its physical properties (904). It does not need inputs indicating (external) obstacles in its vicinity. It instead relies on an input from the previous stage that provides a selection of action that avoids these obstacles shown in FIG. 9 as (905). Therefore, the autogeneration for this last stage (902) only needs to deal with its own inputs of relevance (904) plus a single previous stage input (905) rather than depending on all the inputs that this previous stage requires to detect potential obstacles and determine how to avoid them. Similarly, an earlier stage (910) may pass high-level actions via an input (909) to a later stage (906) without being concerned about how these actions are realized. It may be prepared for the later stages (906) not being able to achieve the desired action, either because of a potential collision or because it goes beyond the capability of the aircraft (916) to execute safely.

To illustrate, if a control system (202) has 21 inputs, a non-partitioned control needs to consider $K^{21}$ input combinations where K is the number of discrete values per input. On the other hand, if the control system is partitioned into 3 stages and these inputs could be strictly partitioned across these 3 stages, each stage would have $K^8$ input combinations, counting one new input per stage, beyond the 7 original, for the input from the previous stage. Thus, the cost is $3 \times K^8$, which is significantly lower than $K^{21}$.

Second, this partitioning reduces the cost of autogeneration for later stages because the autogeneration in that case may start with the suggested action from the previous stage and use that to reduce the scope of actions to evaluate if the suggested action is not at odds with the control constraints being imposed by this current stage with the current IC. For example, in the case of a flying drone, a second stage (906) may adopt the suggested maneuver of bank left if doing so does not put the drone at risk of collision or stall. Then, the expected common cases are more efficient to evaluate because there is no need to consider alternative actions except when the input scenario requires overriding the suggested maneuver.

Third, this partitioning reduces the number of timesteps to consider in each stage, and thus the cost of autogeneration, that is it decouples the time granularity requirement for long-term decisions from the requirements of short term. For example, short-term control of aircraft (902) pose requires high rate of control actions, say at 10 Hz. On the other hand, long-term control (910) actions require a long timeframe for execution, such as executing a turn to align with the runway for landing. Evaluating both in a single stage means having fine-grain timesteps over a long period of time, making the evaluation very expensive. The staging means only the later fine-grain stage needs to consider fine-grain timesteps.

Fourth, the partitioning may also reduce the cost of the objective function. This is because the earlier stages only have to evaluate gross conditions that affect the goodness of the high-level decision, and later stages only have to evaluate the fine-grain conditions. Moreover, as above, there are fewer inputs to consider in each stage than one combined stage.

Fifth, this partitioning allows the autogeneration of control for each stage to be performed independently. For example, if the model for the second stage (906) is refined, the rules for the second stage may be regenerated without modifying the control rules for the first (910) and third (902)

stages. Therefore, over time, the cost of maintaining the control system may be significantly reduced.

In one embodiment, another partitioning that may be used is a separate ruleset that describes what is wrong with an action and subsequently eliminate it. Other techniques may be used, such as those disclosed in U.S. Provisional Patent Application 62/698,672 entitled INCORPORATING RULES INTO COMPLEX AUTOMATED DECISION MAKING filed Jul. 16, 2018 which is incorporated herein by reference for all purposes, and U.S. Patent Application No. 62/154,354 entitled INCORPORATING RULES INTO COMPLEX AUTOMATED DECISION MAKING filed Jul. 15, 2019 which is incorporated herein by reference for all purposes, for example to use rules to find flaws with options explored. That is, input from a stage such as (910) that detects flaws may override a subsequent stage (906) that is exploring actions using one or more inputs (909)

Pruning Actions. In one embodiment, a pruning function is used to eliminate certain actions from consideration to avoid unnecessary overhead, such as for simulation and full evaluation. For example, considering the case of an airplane that is below the target altitude, there is no need in simulating a control setting that reduces the target altitude, such as a flaps setting or a reduced throttle setting. As with the model simulation and objective function, the implementation of the pruning function may be application-specific.

In one embodiment, the pruning function takes as input, some or all of the input subconditions (304 in FIG. 3) and returns a subset of the actions (302 in FIG. 3) corresponding to those that could possibly be useful relative to the objective function. For example, with an AV, if none of the input conditions indicate an unsafe situation, all the emergency actions such as hard braking, left and right swerve may be eliminated from consideration. Also, if there are no input conditions indicating an unsafe situation, if there is a suggested action coming from the upstream module (such as 906 in FIG. 9), it should be adequate to prune the action set to just those consistent with the suggested action and some default action. For example, in the case of an AV, if there are no unsafe conditions and an upstream strategy module is suggesting a merge into the left lane, the AV may reasonably restrict its choice of potential actions to merging left or staying in the same lane.

On the other hand, if there is an unsafe situation, the actions may be pruned to just those corresponding to emergency maneuvers, such as hard braking and swerving. Besides the saving on computation, a further advantage here of this pruning is that it ensures an emergency maneuver is selected when the AV is in an unsafe situation, as opposed to a less aggressive maneuver. For example, there is a risk that the autogeneration might pick, for example, an acceleration and change into the left lane to get out of an unsafe situation which would be more unsafe than just braking in the same lane. This should not happen with an ideal objective function but hard to ensure in practice. To avoid overreacting, the unsafe conditions may be divided into slightly unsafe, unsafe and very unsafe. Then, very aggressive emergency maneuvers are only taken when the scenario is very unsafe.

Symmetry. In some application domains, there is symmetry to certain input scenarios and rules that may be exploited to reduce the autogeneration cost. For example, with an aircraft, if the action is to bank to the left, there is a symmetric set of input subconditions that would cause the aircraft to bank to the right. The action processing step that generates a bank left action rule may recognize that there is a symmetric action to the right and generate a rule where the condition is the symmetric version of the condition of the current rule and the action is to bank right. For example, if an input for the left rule is "close right-adjacent aircraft", then the symmetric condition for the right rule is "close left-adjacent aircraft".

In one embodiment, the action processing, after generating the action for the current input scenario, generates the symmetric condition and then looks up to see if this rule condition is already present in the generated rule set at this point. If not, it adds this symmetric-generated rule to the rule set. This optimization reduces/eliminates cost of iterating over all the potential actions and the associated evaluation for actions that are symmetric for an existing rule.

In one embodiment, a ruleset is used to categorize the current scenario under consideration in the automatic generation process based on current input conditions to aid the pruning. For example, the input conditions (304) may be matched to determine the "root cause" issue to be solved by the control, thereby providing a category to selection of actions (302). It may be possible to categorize further in the case of unsafe and very unsafe.

Preferably, the pruning would not eliminate some action that might be a good choice for the situation. For example, with an autonomous airplane, banking the plane to the left is part of the actions to turn left even though part of the general objective is to maintain the airplane in level flight.

Preprocessing to Prune Input Conditions. There are input value combinations that may not make sense. For instance, with an AV, there reasonably could be an input condition indicating that there is an adjacent left lane that is drivable. However, it should never be the case that the left lane is drivable yet another input condition is indicating there is an adjacent-to-the-left vehicle. One approach is to prune such invalid input combinations out of consideration, thereby reducing the cost of rule generation.

In one embodiment, there is a filtering or pruning of input value combinations to detect and skip over those invalid combinations. Here, "skip over" may mean that the automatic generation emits a rule that matches this case and takes the action of reporting an "impossible" input combination, rather than performing the normal prediction-based evaluation of all possible actions.

An alternative approach is to collapse different logical inputs into a single input to avoid or reduce the redundancy that may lead to invalid input combinations. For example, continuing the above example, preprocessing the inputs may allow the AV control system to create a virtual vehicle that is adjacent to indicate when there is no drivable left lane. Then, the number of input combinations is reduced because a separate "isDrivable" input subcondition is eliminated, thereby reducing the cost of automatic generation. A similar approach may be used to impose behavior relative to traffic signs. For instance, rather than having an input condition indicating a red traffic light, preprocessing the input may introduce a virtual vehicle that stops ahead of the current one, thereby forcing a stop the same as a red light should.

In one embodiment, input preprocessing maps a separate logical input into another actual input before providing to the generated control system, thereby reducing the number of input combinations that the automatic generation needs to consider.

This combining of the above approach requires some preprocessing of the input conditions before they are provided to the generated control system, but in many cases the preprocessing may be relatively simple and may be similar to that required to discretize the inputs before providing to the generated control system, as described herein.

Coarse-Approximating Predictive Simulation. A significant cost in automatic generation of rules is incurred by a prediction step, namely the computation to predict the result of an action (302) under consideration over some number of time steps. This cost is proportional to the number of timesteps taken in the predictive simulation to arrive at a state that may be used to evaluate this action. Each step may incrementally advance the objects of interest, updating their position, velocity and acceleration or whatever dynamic properties of these objects are of interest. In many cases, the actual control system is time-stepped as well. For example, the control system for an AV may update its maneuver decision every 100 milliseconds, thereby ensuring it reacts quickly to some sudden/unexpected event, for example to initiate a swerve to avoid a sudden obstacle in front. That is, the period is chosen based on the required reaction, not the time granularity required for sufficient accurate simulation.

Various maneuvers may take a significant period of time to complete. For example, an AV lane change may require 3-5 seconds to complete. Thus, a naive approach would be to simulate 30 to 50 timesteps to evaluate a potential choice of action, as this naive approach has considerable computational cost.

In one embodiment, this simulation cost may be reduced by taking larger timesteps than used in the actual control system implementation. For example, if this simulation takes 1 second timesteps instead of 100 millisecond timesteps, the number of timesteps to simulate is just 3-5, reducing the cost by an order of magnitude. This approach reduces the accuracy of simulation and thus the accuracy of simulated position, velocity, etc. as of the final timestep. However, there are several points to make about the effect on the control behavior in actual execution using a ruleset generated with this optimization:

1. in actual execution, the finer timestepping, say of 100 millisecond timesteps, is still used by the control system so that it can still react quickly to an unexpected event or difference in conditions has occurred that warrants a different action;
2. if the behavior of some dynamic object changes in an unexpected way during the actual execution, the actual outcome may be significantly different than predicted, even by using a fine-grain timestepped simulation during rule generation. If it does not, the coarse timestepped approach is likely to be sufficiently accurate. The effect of the slight inaccuracy is likely to mean a maneuver may not be selected in some situations in which it is "barely" safe to do so. In sum, there is an unavoidable inaccuracy introduced by the fact that the system cannot know the future very accurately. The coarse-grained simulation is adequate when the assumption about the future is correct and fine-grained is no better if that assumption is not; and
3. there is often some level of inaccuracy introduced by the discretization of the inputs. For example, considering an AV, the vehicle in front might be mapped into the range of 7.5 to 10 meters, as one range in the range set. The auto-generation simulation is then based on some value that is that range, but not necessarily the actual distance. For instance, the simulation could use the midpoint of 8.75 meters for the simulation, so there is a potential inaccuracy in the initial conditions for the simulation of up to 1.25 meters. There are many other sources of inaccuracy, including inaccuracy in the input sensors and inaccuracy of the model for simulation relative to the actual physical realization. One may note that if the actual distance in this example is close to one of the boundaries, such as close to 10 meters away, it is likely in reality to oscillate between this range and the next higher range, causing the control to adjust accordingly whereas if it is far from the boundaries, such as around 8.75 meters, the estimate used in rule generation is reasonably accurate. That is, when the estimate is most inaccurate, a subsequent timestep is likely to compensate.

In general, adequacy of the control system is based on:
1. not making bad decisions given the current scenario, as captured by the input conditions;
2. rapidly revising its decisions based on changing conditions and mispredictions of behavior as indicated by subsequent input values; and/or
3. it being impossible to achieve optimal or extremely accurate control, given all the sources of error/inaccuracy/uncertainty in inputs, model, and future behavior, including elements that are outside the control of this control system.

In summary, the cost of rule generation may be significantly reduced by using coarse-approximating predictive simulation as part of the evaluation of actions.

Selecting Input Range Sets. One aspect as described herein is selecting a set of ranges to be used to discretize the inputs. A number of the potential ranges are predetermined/predefined by engineered properties of the system (206) to be controlled. For example, the takeoff speed for a drone is defined as part of engineering the system. Similarly, the maximum de-acceleration that an AV may achieve is also known for a given vehicle. Also, the maximum safe steering angle for passenger comfort as a function of speed may also be defined by the known effects of the corresponding force on passengers.

These ranges defined by the engineering properties may also be refined by adding intermediate thresholds to slightly increase the number of ranges. For example, starting with a technology-neutral model such as a Responsibility-Sensitive Safety (RSS) safety model, there are ranges corresponding to a safe distance from the front vehicle and to an unsafe distance. However, within the unsafe range, one may identify two or more (sub)ranges that correspond to different severity of collision in the case the front vehicle suddenly applies maximum braking. With this refinement, auto-generation may select a different action based on how unsafe the scenario is. For instance, if the worst case in the case of the front vehicle suddenly applying maximum braking is some minor impact on the front vehicle's bumper, the risk is relatively low.

Mapping input values into a right range includes checking a continuous input value against threshold values to map the value to a range and outputting a range ID for the matching range. The input values may still be preprocessed using known techniques such as smoothing out glitches in the input, as may be done with a Kalman filter.

In summary, the discretization of inputs to suitable ranges may be simple to write and selecting the appropriate ranges, and their associated thresholds, is simplified by the engineered properties of the system and other known aspects, such as human factors.

Rule Combining. In one embodiment, the autogeneration method checks each new rule against the existing rules to see if it may be combined with an existing rule. This combining reduces the space for the table or for the associated rule condition code and also reduces the compute cost of rule condition evaluation.

For example, if a new rule Rj is the same in condition and action as an existing rule Ri except for one binary subcondition, these two rules Ri and Rj may be replaced by a new rule Rk with "don't care" for this subcondition. A "don't care" term as referred to herein is a term in the sense of digital logic, also referred to as redundancy, irrelevancy, and/or an extraneous value corresponding to a term not needed for a particular analysis. Then, rule evaluation may use ternary matching, for example.

Another rule combining approach is to determine that rules Ri and Rj are the same except for the value of some input subcondition IC, and the rule Rk is the same as Ri and Rj except for this input subcondition IC with a different corresponding action. In this case, the rules Ri to Rj may be combined into a single rule Rij, and Rk may be specified with a higher priority on matching than Rij. The three rules may be combined such that the combined rule matches when the input conditions match Rij as well as Rk, and Rk will be used when the input subcondition IC corresponds to Rk. This combining technique also applies when the code is generated as a nested blocks of "if . . . else" blocks, as illustrated with the pseudo code below.

```
if(inputs are Rij) {
  if(IC==Rk.icValue) {
    doRkAction( );
  } else {
    doRijAction( );
  }
}
```

As an example, the action of an aircraft with a given set of input conditions may be the same except for when the altitude is in the range placing it close to the ground. Then, low altitude corresponds to Rk and all the higher altitudes correspond to Rij. This combining approach may be extended to handle the case of multiple specific values plus a "don't care".

Another approach to combining is to recognize when a subset of rules are identical in action and differ pairwise in at most one "don't care" designation on an input and otherwise unique relative to the other rules. In this case, this subset of rules may be combined into a single rule and the matching may use "approximate matching" with a maximum mismatch of one, so the input is going to match this rule even if the inputs differ in at most one input subcondition. This approach may be extended to other variants of approximate match. As referred to herein, an "approximate match" is based at least in part on a result of a specified matching function applied between an input subcondition and a mask. For example, approximate matching may be provided by specifying a distance threshold parameter and outputting input subconditions as matching if they are within the distance threshold according to some distance metric defined between the input subcondition and the mask. Examples of the specified matching function are a distance threshold function and a strength threshold function.

In one embodiment, approximate matching is provided by specifying a distance threshold parameter and outputting input subconditions as matching if they are within the distance threshold according to some distance metric defined between an input subcondition and the mask. For example, one distance metric would be $$d=2*N+1.0*P+0.5*R$$

where N is the number of input subconditions in which the mask is true and the entry is false or vice versa, P is the number of input subconditions which the entry is "not known to be true" and the mask is true, and R is the number of input subconditions in which the entry is known and the mask entry is unknown. The constants in front of these parameters may be specified in registers or variables and thus dynamically change depending on application needs. Many other distance metrics and associated parameters may be realized. In one embodiment, the approximate match operation computes the distance incrementally as it matches each entry in input subconditions to the mask, and determines a mismatch as soon as the computed distance exceeds the distance threshold. In one embodiment, the distance metric is specified as a relative percentage instead of an absolute value.

For example, a subset of rules may be combined by selecting a minimal number of matches or percentage of matches, where a post-matching process selects the best match out of these selected approximate matches.

Parallelizing the Automatic Rule Generation. In one embodiment, the automatic generation of the rule set is performed in parallel by partitioning the input value combinations based on some criteria. For example, if the first three input variables may each take on 10 values, each of one thousand processors may be assigned a specific triple of values for these input variables, thus one out of 1000 possible three-value combinations, and be tasked with evaluating the input scenarios with this setting of these first three input variables. Therefore, each of these 1000 processors may execute in parallel to generate a subset of the rules, where each processor is considering a separate input scenario from the other processors.

In a final step, all 1000 rule subsets may be merged into the final rule set. In the simple approach, these rule subsets are just appended to a master rule set. In an embodiment, the rule combining described above is performed as part of this merger, thereby reducing the total number of rules in the final rule set.

This parallel execution may improve processing speed greatly in many applications. For example, if the strictly sequential execution of automatic rule generation for an autonomous vehicle design required three years of continuous processing, parallelizing this execution with 1000 processors would reduce the execution time to approximately one day, making iterative refinement and correction to the model feasible. Given the modern feasibility of applying many thousands of processors to bear on complex decision logic control applications, this parallelization capability means that even more expensive/detailed control models may be made practical, especially given the cost of the computing may still be far lower than manual development of these control systems.

Figure 10:
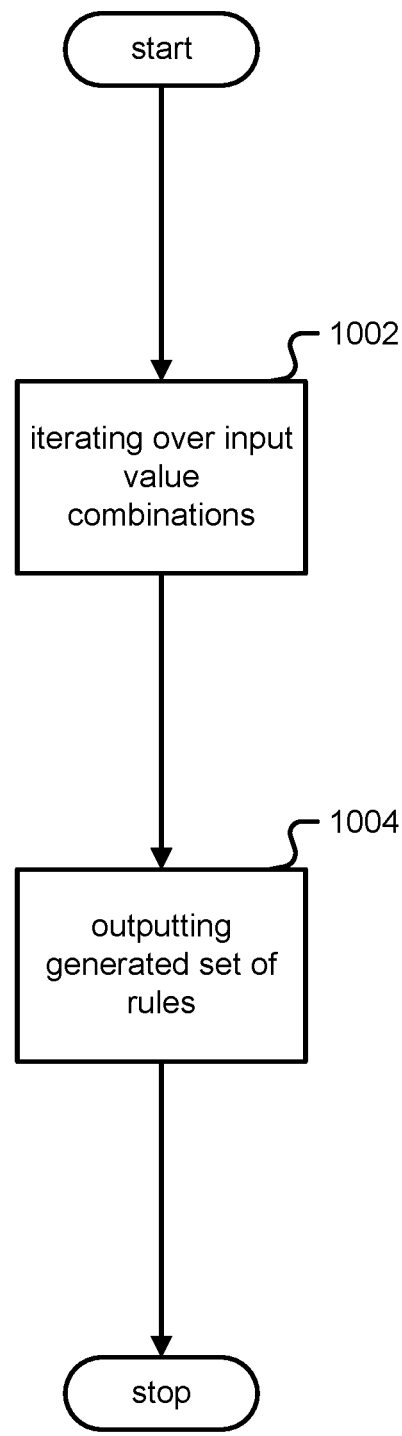
FIG. 10 is a flow diagram illustrating an embodiment of a process to automatically generate a control decision logic for a control system.

FIG. 10 is a flow diagram illustrating an embodiment of a process to automatically generate a control decision logic for a control system. In various embodiments, the process of FIG. 10 can be carried out by a computer as shown in FIG. 1. In one embodiment, the resultant automatically generated control decision logic of FIG. 10 eventually may be carried out at execution time by control system (202) of FIG. 2.

Step (1002) iterates over possible input value combinations of a prediction of an engineered system. In one embodiment, the prediction is a mechanism (e.g., software, hardware, firmware, or a combination) that given the engineered system at an initial state, substantially determines what a later state of the engineered system is given a simulated action. For example, a flight simulator and a corresponding API for third-party interface may be an example of a prediction mechanism. In one embodiment, the engineered system is designed to have predictable performance, which is satisfactory relative to an application requirement that is captured by an objective function.

In one embodiment, the objective function includes a set of computations that provides an indication of whether the engineered system is behaving as desired and/or the objective function quantifies a difference between a simulated behavior and a desired behavior. An example of an objective function is a measure of safety/comfort for a passenger on an airplane.

In step (1004) the generated set of rules is output to be stored or further processed. In one embodiment, the generated set of rules is further processed at least in part by using the generated set of rules for subsequent execution of the control system to control the engineered system.

Figure 11:
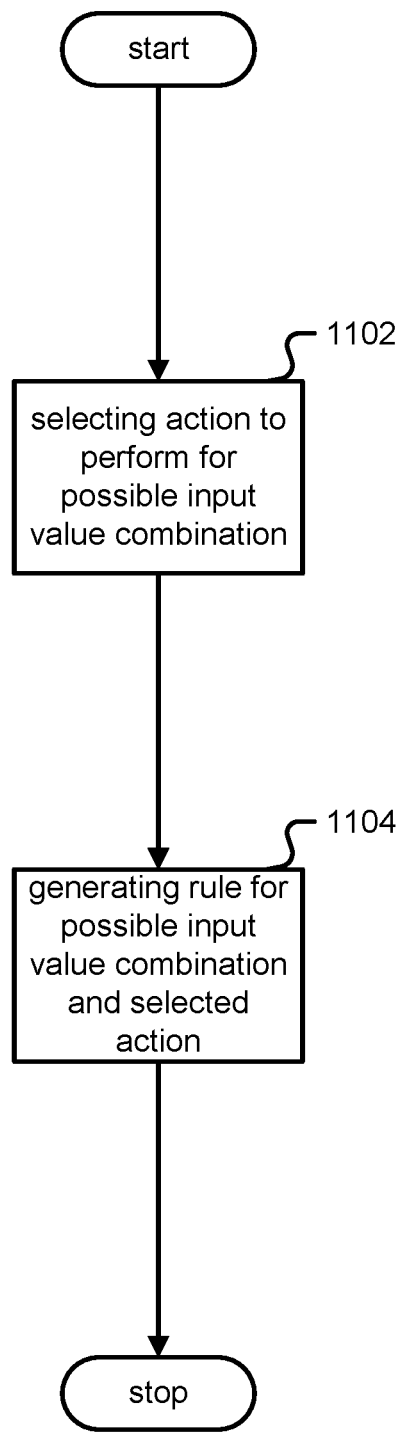
FIG. 11 is a flow diagram illustrating an embodiment of a process to iterate over possible input value combinations.

FIG. 11 is a flow diagram illustrating an embodiment of a process to iterate over possible input value combinations. In one embodiment, the process of FIG. 11 is carried out by a computer as shown in FIG. 1 and/or is part of step (1002) in FIG. 10.

In step (1102), an action is selected to perform on the engineered system for a possible input value combination being iterated over all possible input value combinations. In one embodiment, a second action is selected to perform on the engineered system for the possible input value combination, for example part of an iteration through all actions. In one embodiment, the action includes setting a set point of a controller, for example a PID controller for throttle on an airplane. In one embodiment, selecting the action to perform is based at least in part on a prediction and the objective function.

In one embodiment, selecting the action comprises: iterating over potential actions for the possible input value combination; and selecting the potential action as the action with a preferred result according to the objective function. In one embodiment, iterating over potential actions for the possible input value combination comprises: predicting behavior of the engineered system from an initial state consistent with the possible input value combination under consideration to a subsequent time, assuming a potential action under consideration is taken; and evaluating the predicted state according to the objective function.

In one embodiment, steps (1002) and (1102) may be described in pseudocode as:

for i in all input value combinations {
  for j in all possible actions {
    evaluate objective_function (simulation(i,j));
      record(action,objectiveScore);
  }
  outputRule(inputCondition,getBestAction( ));
  // select action with best objective_function value
  // and output rule
}

In one embodiment, predicting behavior of the engineered system is performed by simulating the engineered system from a state consistent with the possible input value combination forward in time.

In step (1104), a rule is generated specifying a corresponding set of rule conditions being met when the possible input value combination is matched and a corresponding action associated with the rule being the selected action. For example, if an autonomous airplane is in a state of being slightly below the target altitude, possible actions include modifying flaps, ailerons and throttle settings. Reducing the throttle is likely to have negative effect on the objective as is putting the nose down using the flaps, as determined by predicting with these choices of actions. Just raising the nose of the aircraft might be effective as long as doing so does not put the plane at risk of stalling. This behavior is detected by predicting the behavior of the aircraft with current airspeed range and this choice of action. This action would be assigned a low ranking by the objective function if the action would produce a stall. An action may include both increasing the throttle and adjusting the flaps. Each generated rule is thus structured as a condition that is true for the given input value combination and the action that has been determined to be the best relative to the objective function for that input value combination.

Figure 12:
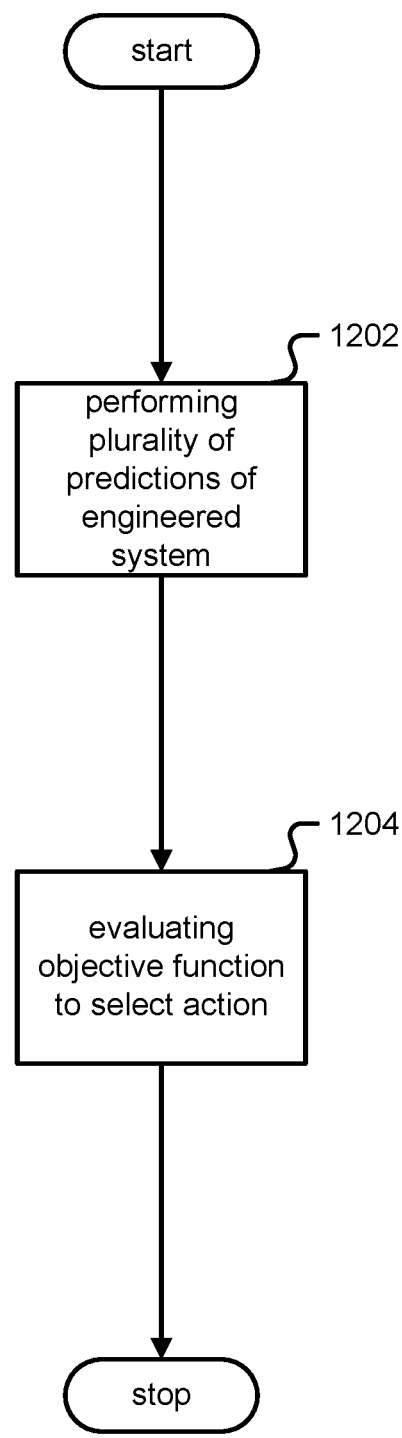
FIG. 12 is a flow diagram illustrating an embodiment of a process to select an action to perform on an engineered system for a possible input value combination.

FIG. 12 is a flow diagram illustrating an embodiment of a process to select an action to perform on an engineered system for a possible input value combination. In one embodiment, the process of FIG. 12 is carried out by a computer as shown in FIG. 1 and/or is part of step (1102) in FIG. 11.

In step (1202), a plurality of predictions of the engineered system scored by evaluating an objective function associated with the engineered system is performed using the possible input value combination and a corresponding plurality of actions. For example, a plurality of predictions, given a windy environment, may include what would be predicted given a first action of an increase in throttle and given a second action of a decrease in throttle. A prediction may include: a conventional time-stepped simulation; and a simpler predictive function, for example with an aircraft, if the elevators go down, the plane loses altitude.

In step (1204), an objective function associated with the engineered system is evaluated to select the action from the corresponding plurality of actions based at least in part on the plurality of prediction results. In one embodiment, the rules are automatically generated by a program that iterates over input value combinations and, for each potential input variable value combination IC, selects the action A' that is expected to achieve a good result with respect to the system objective function, and then outputting a rule with a condition corresponding to this input value combination and action being this action A'.

Figure 13:
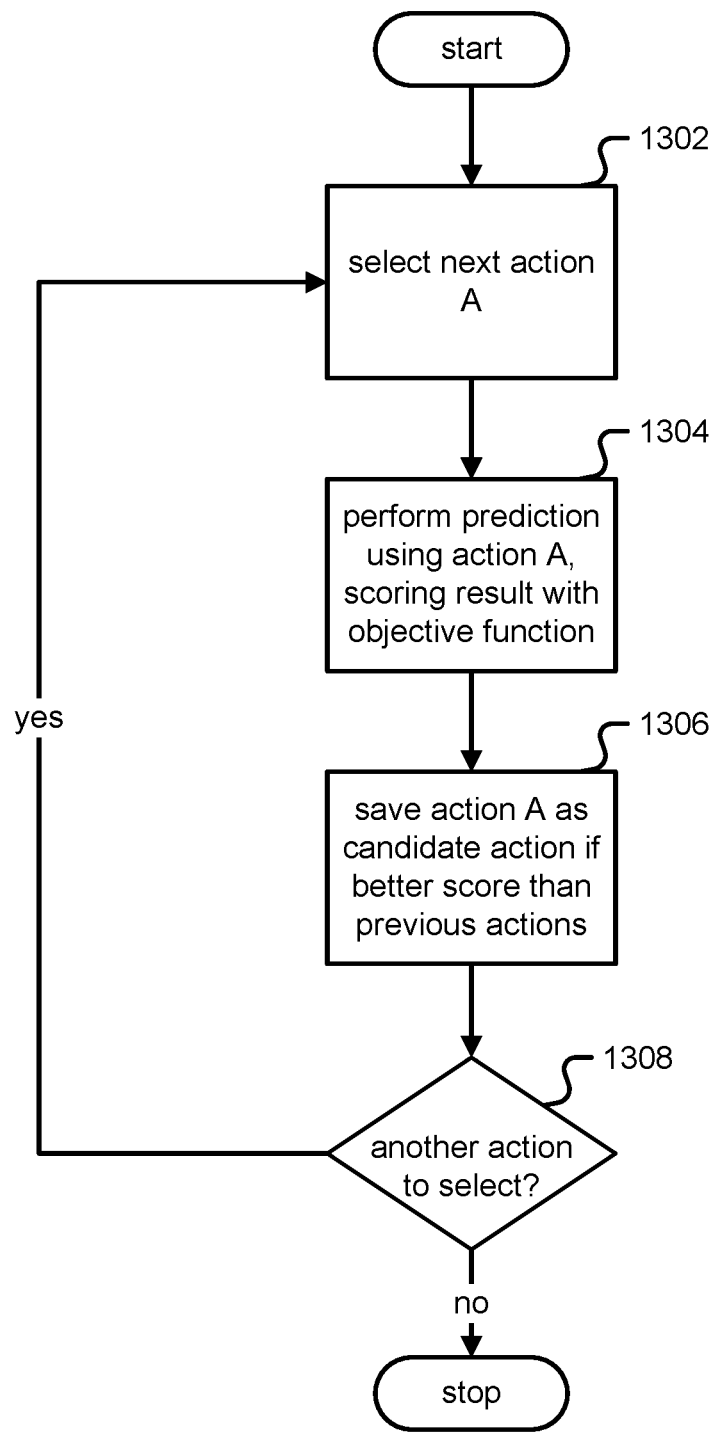
FIG. 13 is a flow diagram illustrating an embodiment of a process to iteratively select an action.

FIG. 13 is a flow diagram illustrating an embodiment of a process to iteratively select an action. In one embodiment, the process of FIG. 13 is carried out by a computer as shown in FIG. 1 and/or is part of step (1102) in FIG. 11.

In an iteration, step (1302) selects a next action A. Step (1304) performs a prediction using that selected action A, scoring the result of the prediction using the objective function. Step (1306) saves this action A as the candidate action if it has a better score than the previously saved action. In one embodiment, the selection of the action A' is performed by predicting, for each credible action A with input conditions IC, the new state S' of the system at time T2, assuming it is in a state corresponding to IC at time T1 and it takes action A. After each such prediction, it evaluates the objective function on this new state S' and records the result. After recording the objective function value for each such new state S' for all actions A, it selects the action A' that achieves the best objective function value. One alternative, not shown in FIG. 13, is to save all the scores for each action and select the action with the best score when the iteration over the possible actions terminates.

In one embodiment, the input values are discretized into a smaller number of possible values. In one embodiment, the input values are discretized into a smaller number of possible values and these discretized values are used in iteration over input value combinations in place of the actual input values.

In one embodiment, a control decision logic is divided into pipeline stages. In one embodiment, the generated set of rules correspond to one of the pipeline stages. In one embodiment, the possible input value combination corresponds to one of the pipeline stages. In one embodiment, the selected action corresponding to a first pipeline stage is included as part of a second possible input value combination corresponding to a second pipeline stage. In one embodiment, a pruning function is used is to eliminate some of the possible input value combinations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
iterate over possible input value combinations of a prediction of an engineered system, including to:
for a possible input value combination:
select an action to perform on the engineered system for the possible input value combination, including to:
perform a plurality of predictions of the engineered system scored by evaluating an objective function associated with the engineered system and using the possible input value combination and a corresponding plurality of actions; and
select the action from the corresponding plurality of actions, the selection being based at least in part on scores of the plurality of predictions; and
generate a rule specifying a corresponding set of one or more rule conditions that is met when the possible input value combination is matched and a corresponding action associated with the rule as a selected action; and
output the generated set of rules to be stored or further processed; and
a memory coupled to the processor and configured to provide the processor with instructions.

2. The system of claim 1, wherein given the engineered system at an initial state and a prediction action, the prediction substantially determines a later state of the engineered system.

3. The system of claim 1, wherein the engineered system is designed to have predictable performance relative to an application requirement that is captured by an objective function.

4. The system of claim 1, wherein the processor is further configured to select a second action to perform on the engineered system for the possible input value combination in an iteration.

5. The system of claim 1, wherein the action includes setting a set point of a controller.

6. The system of claim 1, wherein the selecting of the action to perform is based at least in part on a prediction and the objective function.

7. The system of claim 1, wherein the objective function indicates whether the engineered system is behaving as desired.

8. The system of claim 1, wherein the objective function quantifies a difference between a simulated behavior and a desired behavior.

9. The system of claim 1, wherein the generated set of rules is further processed, including by using the generated set of rules for subsequent execution of a control system to control the engineered system.

10. The system of claim 1, wherein the input values are discretized into a smaller number of possible values.

11. The system of claim 1, wherein the input values are discretized into a smaller number of possible values and the discretized values are used in iteration over input value combinations.

12. The system of claim 1, wherein to select the action comprises to:
iterate over potential actions for the possible input value combination, including to:
predict behavior of the engineered system from an initial state consistent with the possible input value combination to a predicted state at a subsequent time, assuming a potential action under consideration is taken; and
evaluate the predicted state according to the objective function; and
select the potential action as the action with a preferred result according to the objective function.

13. The system of claim 12, wherein to predict behavior of the engineered system includes to simulate the engineered system from a state consistent with the possible input value combination forward in time.

14. The system of claim 1, wherein a control decision logic is divided into pipeline stages.

15. The system of claim 14, wherein the generated set of rules correspond to one of the pipeline stages.

16. The system of claim 14, wherein the possible input value combination corresponds to one of the pipeline stages.

17. The system of claim 14, wherein the selected action corresponding to a first pipeline stage is included as part of a second possible input value combination corresponding to a second pipeline stage.

18. The system of claim 1, wherein a pruning function is used to eliminate some of the possible input value combinations.

19. A method, comprising:
iterating over possible input value combinations of a prediction of an engineered system, comprising, for a possible input value combination:
selecting an action to perform on the engineered system for the possible input value combination, comprising:
performing a plurality of predictions of the engineered system scored by evaluating an objective function associated with the engineered system and using the possible input value combination and a corresponding plurality of actions; and
selecting the action from the corresponding plurality of actions, the selection being based at least in part on scores of the plurality of predictions; and
generating a rule specifying a corresponding set of one or more rule conditions that is met when the possible input value combination is matched and a corresponding action associated with the rule as a selected action; and
outputting the generated set of rules to be stored or further processed.

20. A computer program product embodied in a non-transitory computer readable medium and comprising computer instructions for:
iterating over possible input value combinations of a prediction of an engineered system, comprising, for a possible input value combination:
selecting an action to perform on the engineered system for the possible input value combination, comprising:

performing a plurality of predictions of the engineered system scored by evaluating an objective function associated with the engineered system and using the possible input value combination and a corresponding plurality of actions; and selecting the action from the corresponding plurality of actions, the selection being based at least in part on scores of the plurality of predictions; and generating a rule specifying a corresponding set of rule conditions being met when the possible input value combination is matched and a corresponding action associated with the rule being the selected action; and outputting the generated set of rules to be stored or further processed.

* * * * *